US011407652B2

(12) United States Patent
Dani et al.

(10) Patent No.: US 11,407,652 B2
(45) Date of Patent: Aug. 9, 2022

(54) CONTAINER FOR FILTER-AS-YOU-POUR SYSTEM

(71) Applicant: Brita LP, Oakland, CA (US)

(72) Inventors: Nikhil P. Dani, Pleasanton, CA (US); Jonathan McDonald, Danville, CA (US); Nicole Doan, Danville, CA (US); Jonathan Taylor Wiegele, Venice, CA (US)

(73) Assignee: Brita LP, Oakland, CA (US)

( * ) Notice: Subject to any disclaimer, the term of this patent is extended or adjusted under 35 U.S.C. 154(b) by 0 days.

(21) Appl. No.: 16/687,005

(22) Filed: Nov. 18, 2019

(65) Prior Publication Data

US 2020/0087166 A1 Mar. 19, 2020

Related U.S. Application Data

(63) Continuation of application No. 15/039,008, filed as application No. PCT/US2014/069047 on Dec. 8, (Continued)

(51) Int. Cl.
*C02F 1/00* (2006.01)
*C02F 1/28* (2006.01)
(Continued)

(52) U.S. Cl.
CPC ............ *C02F 1/003* (2013.01); *B01D 29/114* (2013.01); *B01D 29/15* (2013.01); *B01D 29/96* (2013.01);
(Continued)

(58) Field of Classification Search
None
See application file for complete search history.

(56) References Cited

U.S. PATENT DOCUMENTS

| 313,320 A | 3/1885 | Goodale |
| 619,569 A | 2/1899 | Hewel |

(Continued)

FOREIGN PATENT DOCUMENTS

| CA | 2051056 A1 | 3/1992 |
| CA | 2559637 A1 | 3/2007 |

(Continued)

OTHER PUBLICATIONS

Supplementary European Search Report EP 14871227.6, dated Jun. 8, 2017.

(Continued)

*Primary Examiner* — Jonathan M Peo
(74) *Attorney, Agent, or Firm* — Harness, Dickey & Pierce, P.L.C.

(57) ABSTRACT

The invention relates to container bodies configured to be used in filter-as-you-pour systems, where filtering is achieved as the user pours water from the container. Such container bodies may have an undivided internal storage volume, so as to not include a reservoir compartment for unfiltered water. They may be part of systems configured to filter water both as water is introduced into a container body of the system and as water is poured from the container body of the system. The filter assembly may be attached to the container body at a location proximate the outlet of the system. Filter media of the filter assembly may comprise an activated carbon textile material that presents a curved surface to water passing through the filter assembly. The container body may be configured as a pitcher, carafe, water bottle, jug, or other shaped container.

21 Claims, 21 Drawing Sheets

Related U.S. Application Data 2014, now Pat. No. 10,479,697, which is a continuation-in-part of application No. 14/132,134, filed on Dec. 18, 2013, now Pat. No. 10,604,420.

(60) Provisional application No. 61/940,101, filed on Feb. 14, 2014.

(51) Int. Cl.
| | |
|---|---|
| C02F 1/42 | (2006.01) |
| B01D 29/15 | (2006.01) |
| B01D 29/96 | (2006.01) |
| B01D 35/30 | (2006.01) |
| B01D 29/11 | (2006.01) |
| A47J 31/60 | (2006.01) |
| C02F 101/20 | (2006.01) |
| C02F 101/12 | (2006.01) |
| C02F 103/06 | (2006.01) |

(52) U.S. Cl.
CPC ............. *B01D 35/30* (2013.01); *C02F 1/002* (2013.01); *C02F 1/283* (2013.01); *C02F 1/42* (2013.01); *A47J 31/605* (2013.01); *C02F 2101/12* (2013.01); *C02F 2101/20* (2013.01); *C02F 2103/06* (2013.01); *C02F 2209/40* (2013.01); *C02F 2303/185* (2013.01); *C02F 2307/02* (2013.01); *C02F 2307/04* (2013.01)

(56) References Cited

U.S. PATENT DOCUMENTS

| | | |
|---|---|---|
| 1,074,168 A | 9/1913 | Feinstein |
| 2,689,048 A | 9/1954 | Powers |
| 3,016,984 A | 1/1962 | Getzin |
| 3,289,847 A * | 12/1966 | Rothemund ............. C02F 1/003 |
| | | 210/266 |
| 3,497,069 A | 2/1970 | Lindenthal et al. |
| 3,535,852 A | 10/1970 | Hirs |
| 3,554,377 A | 1/1971 | Miller |
| 3,662,780 A | 5/1972 | Marsh |
| 3,830,042 A | 8/1974 | MacDonnell |
| 4,066,551 A | 1/1978 | Stern |
| 4,096,742 A | 6/1978 | Musolf et al. |
| 4,121,727 A | 10/1978 | Robbins et al. |
| 4,154,688 A | 5/1979 | Pall |
| 4,259,096 A | 3/1981 | Nakamura et al. |
| 4,605,499 A * | 8/1986 | Wise ................. C02F 1/283 |
| | | 210/282 |
| 4,696,742 A | 9/1987 | Shimazaki |
| 4,764,274 A | 8/1988 | Miller |
| 4,921,600 A | 5/1990 | Meissner |
| 4,948,499 A | 8/1990 | Peranio |
| 4,983,288 A | 1/1991 | Karbachsch et al. |
| 5,061,367 A | 10/1991 | Hatch et al. |
| 5,076,922 A | 12/1991 | DeAre |
| 5,102,541 A | 4/1992 | Breitbach |
| 5,106,501 A | 4/1992 | Yang et al. |
| 5,122,270 A | 6/1992 | Ruger et al. |
| 5,128,034 A * | 7/1992 | Kool .................... B01D 35/143 |
| | | 210/232 |
| 5,169,528 A | 12/1992 | Karbachsch et al. |
| 5,202,183 A | 4/1993 | Hosako et al. |
| 5,211,846 A | 5/1993 | Kott et al. |
| 5,225,078 A | 7/1993 | Polasky et al. |
| 5,595,659 A | 1/1997 | Huang et al. |
| 5,609,759 A * | 3/1997 | Nohren, Jr. ............. C02F 1/003 |
| | | 210/266 |
| 5,674,391 A | 10/1997 | Nohren, Jr. |
| 5,681,463 A | 10/1997 | Shimizu et al. |
| 5,736,045 A | 4/1998 | Bies et al. |
| 5,770,073 A | 6/1998 | Bach et al. |
| 5,897,779 A | 4/1999 | Wisted et al. |
| 5,904,854 A | 5/1999 | Shmidt et al. |
| 5,919,365 A | 7/1999 | Collette |
| 5,980,616 A | 11/1999 | Johnson et al. |
| 5,980,743 A | 11/1999 | Bairischer |
| 6,004,460 A | 12/1999 | Palmer et al. |
| 6,161,710 A | 12/2000 | Dieringer et al. |
| 6,189,436 B1 | 2/2001 | Brooks |
| 6,193,886 B1 | 2/2001 | Nohren, Jr. |
| 6,200,471 B1 | 3/2001 | Nohren, Jr. |
| 6,254,768 B1 | 7/2001 | Dulieu et al. |
| 6,368,506 B1 | 4/2002 | Gebert et al. |
| 6,383,381 B1 | 5/2002 | O'Flynn et al. |
| 6,435,209 B1 | 8/2002 | Heil |
| 6,524,411 B2 | 2/2003 | Pulek et al. |
| 6,565,743 B1 | 5/2003 | Poirier et al. |
| 6,569,329 B1 * | 5/2003 | Nohren, Jr. ............. B01D 29/15 |
| | | 210/282 |
| 6,589,904 B1 | 7/2003 | Iwasaki et al. |
| 6,599,427 B2 | 7/2003 | Nohren et al. |
| 6,733,669 B1 | 5/2004 | Crick |
| 6,841,067 B1 | 1/2005 | Hofmann et al. |
| 7,473,362 B1 | 1/2009 | Nohren, Jr. |
| 7,828,969 B2 | 11/2010 | Eaton et al. |
| 8,051,989 B1 | 11/2011 | Tondreau |
| 8,080,160 B2 | 12/2011 | Yanou et al. |
| 8,133,525 B2 | 3/2012 | Skalski et al. |
| 8,419,818 B2 | 4/2013 | Page |
| 9,394,861 B2 | 7/2016 | Berisha et al. |
| 9,511,315 B2 | 12/2016 | Cur et al. |
| 10,035,713 B2 | 7/2018 | Dani et al. |
| 10,125,027 B2 | 11/2018 | Dani et al. |
| 10,343,931 B2 | 7/2019 | Dani et al. |
| 10,351,442 B2 | 7/2019 | Dani et al. |
| 10,391,427 B2 | 8/2019 | Dani et al. |
| 10,479,697 B2 | 11/2019 | Dani et al. |
| 10,604,420 B2 | 3/2020 | Wiegele |
| 10,654,725 B2 | 5/2020 | Dani et al. |
| 10,752,516 B2 | 8/2020 | Wiegele |
| 2001/0035094 A1 | 11/2001 | Takagaki et al. |
| 2002/0020673 A1 | 2/2002 | Nohren et al. |
| 2002/0060176 A1 | 5/2002 | Mierau et al. |
| 2002/0066700 A1 | 6/2002 | Dolfel et al. |
| 2002/0083841 A1 | 7/2002 | Chaouachi et al. |
| 2002/0166811 A1 | 11/2002 | Walker et al. |
| 2003/0222010 A1 * | 12/2003 | Bassett .................. B01D 27/06 |
| | | 210/312 |
| 2004/0060858 A1 | 4/2004 | Lucas et al. |
| 2005/0205482 A1 | 9/2005 | Gladney |
| 2005/0279768 A1 | 12/2005 | Chatrath |
| 2006/0144781 A1 | 7/2006 | Carlson et al. |
| 2007/0007296 A1 | 1/2007 | Guyot |
| 2007/0095758 A1 | 5/2007 | Bortun et al. |
| 2007/0221605 A1 | 9/2007 | Pugne et al. |
| 2008/0128364 A1 | 6/2008 | Cloud et al. |
| 2008/0274312 A1 | 11/2008 | Schelling et al. |
| 2009/0039028 A1 | 2/2009 | Eaton et al. |
| 2009/0139926 A1 | 6/2009 | Hassebrauck |
| 2009/0184042 A1 | 7/2009 | Steed et al. |
| 2010/0170839 A1 | 7/2010 | Kohl |
| 2010/0219151 A1 * | 9/2010 | Risheq .................... C02F 1/002 |
| | | 215/44 |
| 2010/0266351 A1 | 10/2010 | Vogel et al. |
| 2010/0282682 A1 | 11/2010 | Eaton et al. |
| 2011/0079551 A1 | 4/2011 | Olson et al. |
| 2011/0079572 A1 | 4/2011 | Olson et al. |
| 2011/0247975 A1 | 10/2011 | Rapparini |
| 2011/0278216 A1 * | 11/2011 | Hull ...................... B01D 35/143 |
| | | 210/236 |
| 2011/0303589 A1 | 12/2011 | Kuennen et al. |
| 2011/0305801 A1 | 12/2011 | Beer |
| 2012/0017766 A1 | 1/2012 | Anson et al. |
| 2012/0055862 A1 * | 3/2012 | Parekh ................... C02F 1/283 |
| | | 210/244 |
| 2012/0061312 A1 | 3/2012 | Busick et al. |
| 2012/0187036 A1 | 7/2012 | Risheq |
| 2012/0193282 A1 | 8/2012 | Wolf et al. |
| 2012/0214375 A1 | 8/2012 | Kitano et al. |
| 2012/0255890 A1 | 10/2012 | Cumberland |
| 2012/0267314 A1 | 10/2012 | Minton-Edison et al. |
| 2012/0292247 A1 | 11/2012 | Moon et al. |

(56) References Cited

U.S. PATENT DOCUMENTS

| | | |
|---|---|---|
| 2012/0298570 A1 | 11/2012 | Osawa et al. |
| 2012/0298614 A1 | 11/2012 | Nelson |
| 2012/0325735 A1 | 12/2012 | Dicks et al. |
| 2013/0037481 A1 | 2/2013 | Lalouch et al. |
| 2013/0045252 A1 | 2/2013 | Rawlings et al. |
| 2013/0095212 A1 | 4/2013 | Beer |
| 2013/0125748 A1 | 5/2013 | Taylor et al. |
| 2013/0156897 A1 | 6/2013 | Goldstein |
| 2013/0175228 A1 | 7/2013 | Utsch et al. |
| 2013/0199989 A1 | 8/2013 | Carter et al. |
| 2013/0233890 A1 | 9/2013 | Melzer |
| 2013/0239528 A1 | 9/2013 | Coulonvaux et al. |
| 2013/0319927 A1 | 12/2013 | Lin |
| 2014/0014566 A1 | 1/2014 | Mitchell |
| 2014/0151285 A1 | 6/2014 | Cur et al. |
| 2015/0076050 A1 | 3/2015 | May |
| 2015/0166364 A1 | 6/2015 | Wiegele |
| 2016/0167980 A1 | 6/2016 | Dani et al. |
| 2016/0256359 A1 | 9/2016 | Trawick et al. |
| 2016/0376161 A1 | 12/2016 | Dani et al. |
| 2016/0376162 A1 | 12/2016 | Dani et al. |
| 2016/0376163 A1 | 12/2016 | Dani et al. |
| 2016/0376164 A1 | 12/2016 | Dani et al. |
| 2016/0376165 A1 | 12/2016 | Dani et al. |
| 2017/0001880 A1 | 1/2017 | Dani et al. |
| 2018/0250615 A1 | 9/2018 | Dani et al. |
| 2018/0264222 A1 | 9/2018 | Dantanarayana et al. |
| 2018/0264382 A1 | 9/2018 | Dani et al. |
| 2018/0265374 A1 | 9/2018 | Dani et al. |
| 2018/0311600 A1 | 11/2018 | Dani et al. |
| 2019/0382282 A1 | 12/2019 | Parekh et al. |

FOREIGN PATENT DOCUMENTS

| | | |
|---|---|---|
| CA | 2874153 A1 | 6/2015 |
| CA | 2933185 A1 | 6/2015 |
| EP | 0402661 A1 | 12/1990 |
| EP | 0617951 A2 | 10/1994 |
| GB | 2261362 A | 5/1993 |
| GB | 2268680 A | 1/1994 |
| GB | 2280596 A | 2/1995 |
| GB | 2284563 B | 10/1997 |
| JP | 04-126585 | 4/1992 |
| JP | H04126585 A | 4/1992 |
| JP | 657489 U | 8/1994 |
| WO | 9835738 A1 | 8/1998 |
| WO | 0071468 A1 | 11/2000 |
| WO | PCT/US00/71456 | 11/2000 |
| WO | PCT/US00/71468 A1 | 11/2000 |
| WO | 2011145640 A1 | 11/2011 |
| WO | 2012031853 A1 | 3/2012 |
| WO | 2012150506 A2 | 11/2012 |
| WO | 2013044079 A1 | 3/2013 |
| WO | 2013088260 A1 | 6/2013 |
| WO | 2014089207 A1 | 6/2014 |
| WO | 2015073144 A1 | 5/2015 |
| WO | 2015094739 A1 | 6/2015 |
| WO | 2015094741 A1 | 6/2015 |
| WO | 2017055914 A1 | 4/2017 |
| WO | 2017055915 A1 | 4/2017 |
| WO | 2017055916 A1 | 4/2017 |
| WO | 2017055918 A1 | 4/2017 |

OTHER PUBLICATIONS

Supplementary European Search Report EP 14872175.6, dated Jun. 8, 2017.
Supplementary European Search Report EP 14871914.9, dated Jun. 13, 2017.
Supplementary European Search Report EP 14871701.0 dated Jun. 8, 2017.
CamelBak: "CamelBak Relay Water Pitcher," published Jan. 22, 2014, p. 1, XP054977371. Retrieved from Internet: URL: https://www.youtube.com/watch?v=01TdZCF8AqY [retrieved on May 18, 2017].
Supplementary European Search Report EP 14870910.8, dated Jun. 8, 2017.
Supplementary European Search Report EP 14871467.8, dated Jun. 8, 2017.
NPL-1 ("Activated Carbon Filter Bags", Filterek) Date: Jun. 4, 2012.
Oxford Dictionary Definition—coextensive, 2017, 1 page.
Oxford Dictionary Definition—immediately, 2017, 1 page.
Hutton, I.M. 2007, Handbook of Nonwoven Filter Media (1st ed.), pp. 96-99.
International Search Report and Written Opinion dated Feb. 6, 2017 in corresponding/related International Application No. PCT/IB2016/001472.
International Preliminary Report on Patentability dated Apr. 3, 2018 in corresponding/related International Application No. PCT/IB2016/001472.
International Search Report and Written Opinion dated Jan. 26, 2017 in corresponding/related International Application No. PCT/IB2016/001474.
International Preliminary Report on Patentability dated Apr. 3, 2018 in corresponding/related International Application No. PCT/IB2016/001474.
International Search Report and Written Opinion dated Jan. 27, 2017 in corresponding/related International Application No. PCT/IB2016/001479.
International Preliminary Report on Patentability dated Apr. 3, 2018 in corresponding/related International Application No. PCT/IB2016/001479.
International Search Report and Written Opinion dated Jan. 27, 2017 in corresponding/related International Application No. PCT/IB2016/001495.
International Preliminary Report on Patentability dated Apr. 3, 2018 in corresponding/related International Application No. PCT/IB2016/001495.
Australian Office Action dated Feb. 22, 2018 in corresponding/related Australian Application No. 2014366927.
Australian Office Action dated Mar. 8, 2018 in corresponding/related Australian Application No. 2014366937.
Australian Office Action dated May 25, 2018 in corresponding/related Australian Application No. 2014366492.
Australian Office Action dated Jun. 22, 2018 in corresponding/related Australian Application No. 2014366926.
Australian Office Action dated Dec. 20, 2018 in corresponding/related Australian Application No. 2014366927.
Activated Carbon Fiber & Activated Carbon Felt by HP Materials Solutions, Inc. (Possible NPL) No publication date available.
Office Action dated Mar. 4, 2019 in corresponding/related Australian Application No. 2014366937.
Supplementary European Search Report EP 14871227.6, dated May 31, 2017.
Supplementary European Search Report EP 14871467.8, dated May 31, 2017.
Office Action regarding U.S. Appl. No. 15/038,996, dated Sep. 22, 2020.
International Search Report regarding International Application No. PCT/US00/14756, dated Aug. 30, 2000.
Canadian Office Action regarding Canadian Patent Application No. 2,933,046, dated Apr. 9, 2021.
Nov. 19, 2019—PTAB Decision 14132134 (Year: 2019).
Canadian Office Action regarding Canadian Patent Application No. 3000308, dated Feb. 23, 2022.

\* cited by examiner

CONTAINER FOR FILTER-AS-YOU-POUR SYSTEM

CROSS-REFERENCE TO RELATED APPLICATIONS

This application is a continuation of U.S. application Ser. No. 15/039,008 filed on May 24, 2016, now U.S. Pt. No. 10,479,697, which application is a National Stage of International Application No. PCT/US2014/069047, filed Dec. 8, 2014, now WO 2015/094752 A1, which: (1.) claims the benefit under 35 U.S.C. 119(e) of U.S. Provisional Patent Application Ser. No. 61/940,101, filed Feb. 14, 2014; and (2.) is a continuation-in-part of U.S. patent application Ser. No. 14/132,134, filed Dec. 18, 2013, now U.S. Pat. No. 10,604,420. The entire disclosures of each of the above applications are incorporated herein by reference.

FIELD

The present invention is directed to filtered pour-through container systems, such as pitcher systems, where filtering is achieved as the user pours water from the container. More specifically, the present invention is directed to containers included with such systems.

BACKGROUND

This section provides background information related to the present disclosure which is not necessarily prior art.

Drinking water, such as water from water purification facilities or well water, can contain certain additives or contaminants (referred to herein collectively as contaminants) such as chlorine, chloramines, or various organic components. Chlorine is typically intentionally added to water to control microbes. For some, chlorinated water imparts an unpleasant taste or smell. Its presence may also raise health concerns to some consumers.

Existing pour-through pitcher systems, such as those available from BRITA allow a user to fill a reservoir of the pitcher with water, which passes (under influence of gravity) through a filter, which removes contaminants from the water. The filtered water exits the filter into the main body of the pitcher, and may then be poured therefrom, providing filtered water for drinking.

One disadvantage of existing systems is that it may take several minutes for water introduced into the reservoir of such a system to be filtered, and ready for drinking. It would be beneficial to provide systems that might provide filtered water poured from a pitcher or other container where the time required to filter may be reduced.

SUMMARY

This section provides a general summary of the disclosure, and is not a comprehensive disclosure of its full scope or all of its features.

The present invention relates to systems for holding and filtering water. The systems allow for filtering to occur as water is poured from the container of the system. In this way, users can be provided with water that is filtered as it is poured, and this can advantageously be achieved while providing relatively high flow rates, with contaminant removal efficiencies similar to those provided by the existing slow flow reservoir-based systems.

In an embodiment, the present invention is directed to a reservoir-less filter-as-you-pour system comprising a container body including an internal storage volume configured to hold water, and a filter assembly. The filter assembly may be attachable to the container body or an associated lid body, and may be disposed so as to be in a flow stream of the water as the water is poured from the container body through the system outlet. As a result, all water exiting through the outlet passes through the filter assembly before exiting through the outlet. Advantageously, the container body may not include any reservoir as do other systems. For example, the internal storage volume defined by the container body may be undivided, so as to not include any such reservoir compartment for unfiltered water and another compartment for filtered water, with a filter assembly disposed between the two compartments. As a result, the system may only filter water as water is poured out of the container body.

In another embodiment, the present invention is directed to a filter-as-you-pour system comprising a container body configured to hold water, an outlet through which filtered water may be poured, a lid body attachable to (e.g., over) the container body, and a filter assembly. The filter assembly may be fixedly attached or removably attached to the container body at a location proximate the outlet of the system, and may be configured to filter water as it is poured from the container body through the filter assembly, and out the outlet of the system.

In another embodiment, the present invention is directed to a system which may filter water both as it enters the container body and as it is poured therefrom (e.g., through the same filter, using a single, combined inlet and outlet). Such a system may include a container body configured to hold water, a filter assembly, and a single opening that serves as both an inlet and outlet. The container body may be selectively attachable to a lid. The filter assembly may be attachable to at least one of the container body or the lid body. The filter assembly may be disposed so as to be in a flow stream of water as the water is both (1) introduced into the container body through the opening (serving as an inlet) and (2) poured from the container body through that same opening (serving as an outlet), so that the water is filtered both as it enters and exits the container body.

Further features and advantages of the present invention will become apparent to those of ordinary skill in the art in view of the detailed description of preferred embodiments below.

DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
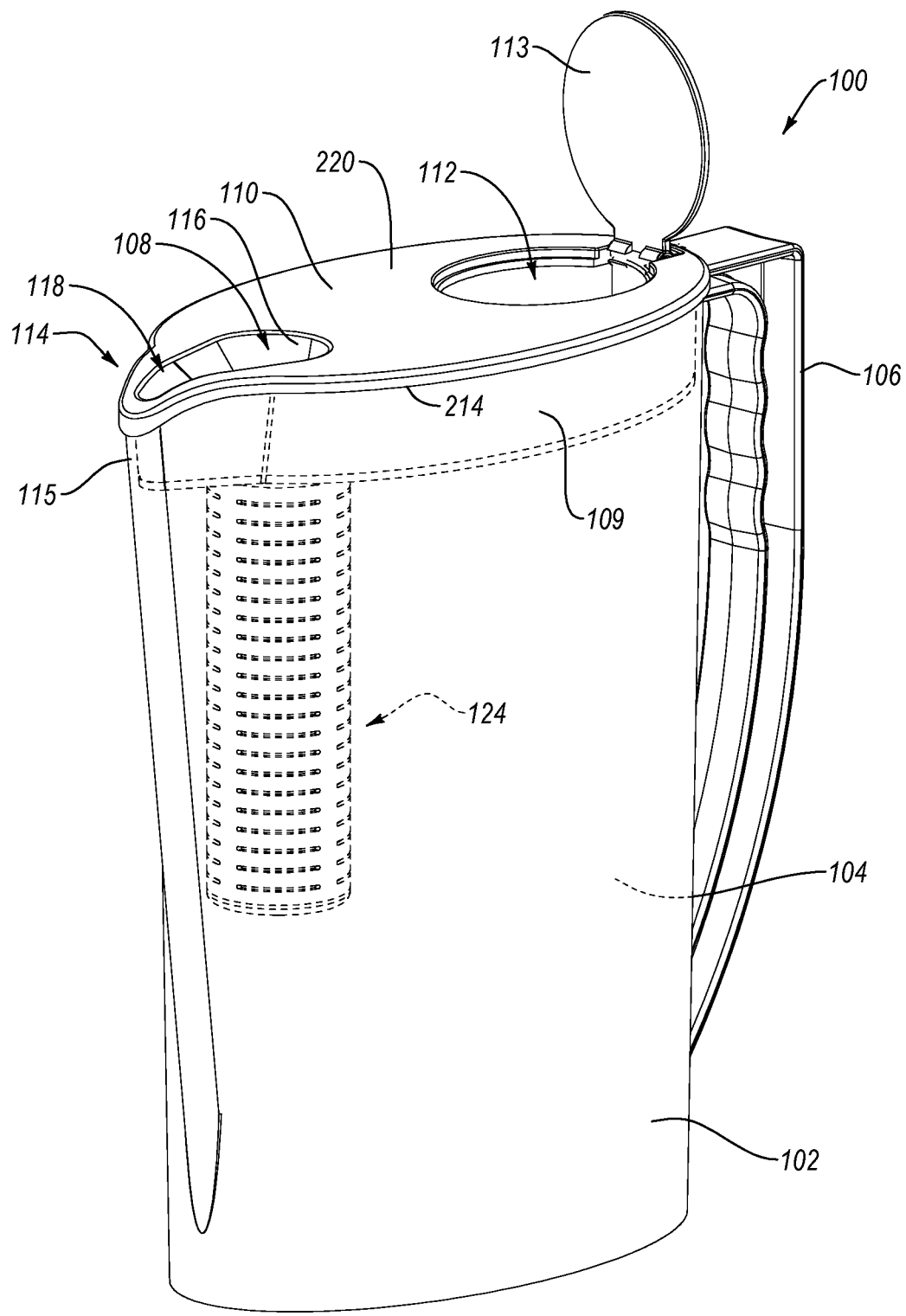
FIG. 1A is a perspective view of an embodiment of an exemplary filter-as-you-pour system.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an," and "the" include plural referents unless the content clearly dictates otherwise. Thus, for example, reference to a "surfactant" includes one, two, or more surfactants.

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Various aspects of the present devices, systems, and methods may be illustrated with reference to one or more exemplary embodiments. As used herein, the term "exemplary" means "serving as an example, instance, or illustration," and should not necessarily be construed as preferred or advantageous over other embodiments disclosed herein.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentages ("wt %'s") are in wt % (based on 100 weight % active) of the particular material present in the referenced composition, any remaining percentage typically being water or an aqueous carrier sufficient to account for 100% of the composition, unless otherwise noted. For very low weight percentages, the term "ppm" corresponding to parts per million on a weight/weight basis may be used, noting that 1.0 wt % corresponds to 10,000 ppm.

I. Introduction

The present disclosure is directed to gravity-fed water filtration container systems which may advantageously provide for faster flow rates of the water through the filter assembly of the system, allowing unfiltered water to be filtered as it is poured from the container of the system (i.e., a filter-as-you-pour system).

Such a system may include a container body defining an internal storage volume, and a container outlet through which water within the container body may be poured and simultaneously filtered. The system may further include a lid that may be releasably attachable over the container body (e.g., a pitcher body), and a filter assembly attachable to at least one of the lid or the container body. The filter assembly may be disposed so as to be in a flow stream of the water, as the water is poured out of the container body through an outlet of the system, so that the stream of water exiting through the outlet is simultaneously filtered as it is poured from the container body.

II. Exemplary Containers for Filter-As-You-Pour Systems

FIG. 1A shows an embodiment of an exemplary filter-as-you-pour system 100 configured to filter water as water is poured from a container body 102. In another embodiment, system 100 may also be configured to filter water as water is introduced into container body 102 of system 100. The system 100 includes a container body 102 including an internal storage volume 104 configured to hold filtered or unfiltered water. Container body 102 may be selectively and releasably attachable to lid body 110. In the illustrated embodiment, an inlet 112 is provided in lid body 110, which inlet 112 may be covered by an inlet cover 113. The internal storage volume 104 is preferably at least about 300 mL, and may be several liters (e.g., about 2 to about 6 liters). The container body may be a pitcher, carafe, thermos, water bottle, canteen, jug, water cooler, flask, flagon, ewer, decanter, jar, or glass, for example. In some embodiments, container body 102 is a pitcher, a personal water bottle, a carafe, or a water cooler (e.g., insulated). As shown, container body 102 may include a handle 106 to aid in pouring water disposed within storage volume 104 out outlet 108 of system 100.

The lid body 110 and container body 102 may respectively comprise complementary locking structures configured to releasably engage one another so that lid body 110 may be selectively and releasably attached to (e.g., over) container body 102. Friction fits between the two components, or any of various lock and key type locking structures may be employed, e.g., so as to ensure that lid 110 does not inadvertently fall off of container body 102.

As illustrated in FIG. 1A, container body 102 may be configured as a pitcher, e.g., including a spout 114, adjacent outlet 108. Spout 114, as illustrated, may be defined by structures in both container body 102 and lid body 110. For example, container body 102 is shown as including a generally triangular extending lip portion 115 which tapers towards spout 114. Similarly, lid 110 is shown as including a corresponding cross-sectional shape, also being tapered and with a generally triangular extending portion at the region corresponding to spout 114, so that lid 110 fits into the open top of container body 102 (e.g., see FIG. 1B). In addition, lid 110 is shown as including flared portions 116 adjacent outlet 108, providing a surface which slopes downward from a top of lid 110 to outlet 108. As a result, flared portion 116 defines a larger opening adjacent the top of lid 110, which slopes downward, much like a flared funnel, towards outlet 108.

In FIG. 1A, outlet 108 is shown as being disposed somewhat proximal relative to the triangular portion and spout 114 from which water exits the system, so that water exiting outlet 108 will flow along the tapered spout portion 118 of lid 110, until it reaches the extreme end of tapered spout portion 118, and exits the system 100 (e.g., into a glass, other container, etc.). The outlet 108 may be in lid body 110 or in container body 102, or it may be located between lid body 110 and container body 102.

In some embodiments, system 100 or lid body 110 may include a flow control device (e.g., a valve, grating, screen, spout, etc.) disposed proximate (e.g., in or over) outlet 108 to regulate an exit flow rate of water being poured through the outlet. For example, a spout 314 as described in conjunction with FIGS. 6A-6C may be provided for regulating flow. Additional details of such embodiments are disclosed in U.S. Pat. No. 10,351,442, herein incorporated by reference in its entirety.

The system comprises a filter assembly 124 which may be attachable to lid body 110, container body 102, or both lid body 100 and container body 102. The filter assembly 124 is configured to remove contaminants (e.g., chlorine) from the water. Filter assembly 124 may be disposed so as to be in a flow stream of the water only as the water is poured out of container body 102 through outlet 108. This allows the stream of water exiting through outlet 108 to be filtered as it is poured from container body 102. The filter assembly 124 may be directly attachable to lid body 110 (e.g., through a threaded or other connection) and disposed about outlet 108 so that all water flowing through outlet 108 first passes through filter assembly 124.

Figure 7A:
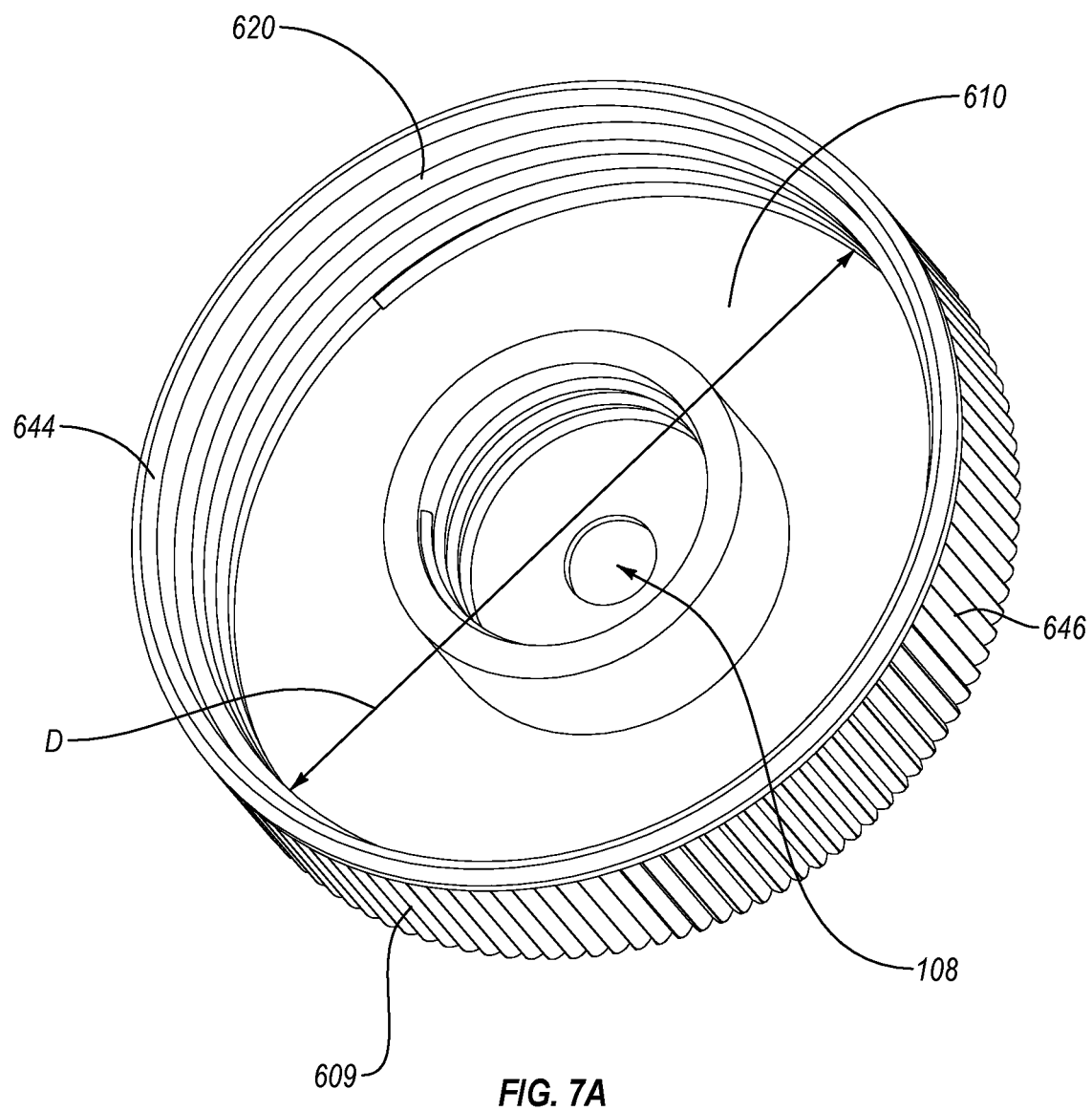
FIGS. 7A-7B are perspective views of another embodiment of a lid body and associated container body configured as a water bottle, respectively.
Figure 7B:
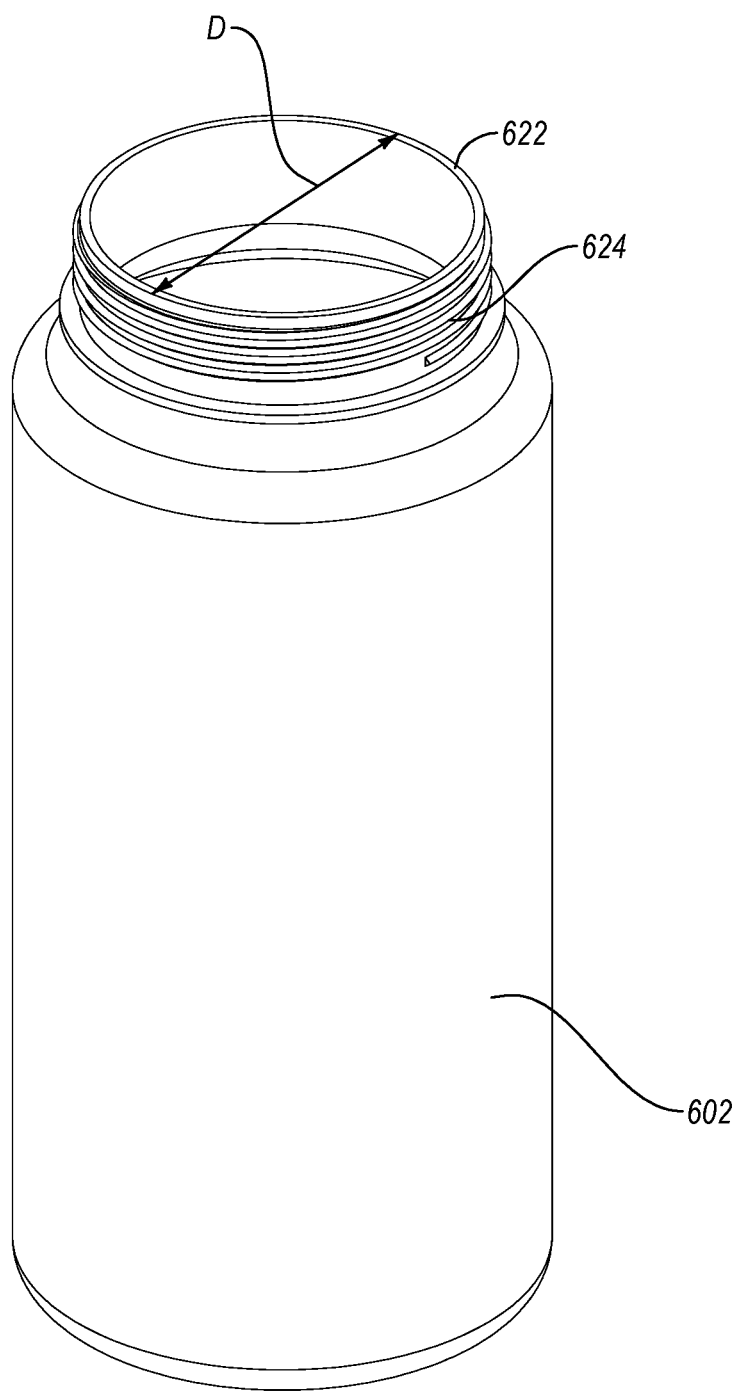

All water exiting through outlet 108 passes through filter assembly 124 before exiting through outlet 108. In order for this to occur, filter assembly 124 may be configured to releasably attach to lid body 110 around outlet 108 of lid body 110 so that the only way water can access outlet 108 is by passing through filter assembly 124. In an embodiment, lid body 110 and system 100 may be configured so that water introduced into container body 102 through inlet 112 flows directly into container body 102 without first flowing through a filter or a reservoir. In another embodiment, a filter may be disposed proximate inlet 112, so that water is filtered both on entry and exit. In one such an embodiment, the inlet and outlet may be one and the same (i.e., the filter assembly may be a dual pass filter assembly, so that the water passes therethrough on entry and again on exit). FIGS. 7A-7B, described below, illustrate such an embodiment including a combined inlet and outlet, where the filter may filter both on entry and exit.

The lid body 110 may be releasably attachable to filter assembly 124 through complementary locking structures of lid body 110 and filter assembly 124 so that lid body 110 may be selectively and releasably attached to filter assembly 124. For example, in an embodiment, a complementary thread and groove attachment mechanism may be employed. Various other attachment mechanisms are disclosed herein, and in U.S. Pat. No. 10,125,027, herein incorporated by reference in its entirety. The lid body 110 may be directly attachable to filter assembly 124. In another embodiment, there may be intervening structure between the filter assembly and the lid body.

Figure 1B:
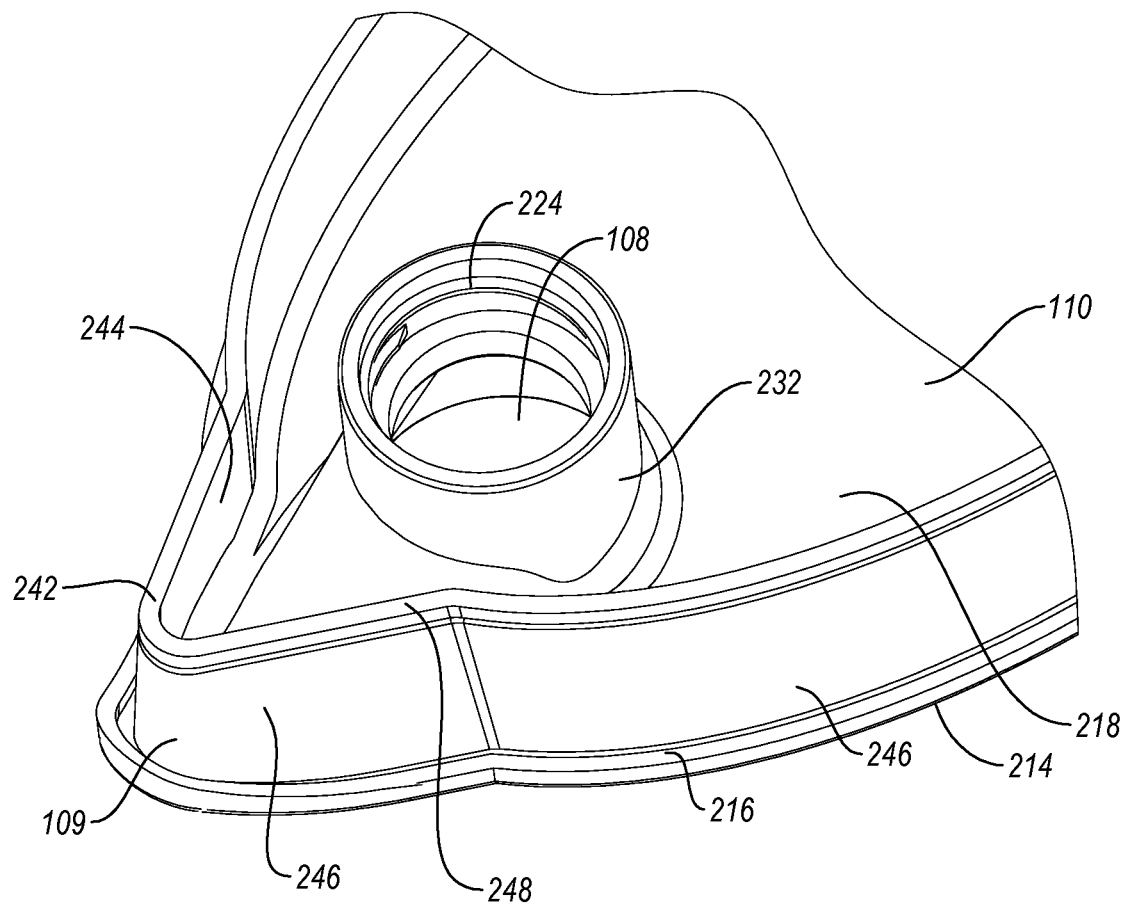
FIG. 1B is a bottom perspective view of the front portion of an exemplary lid body.
Figure 2A:
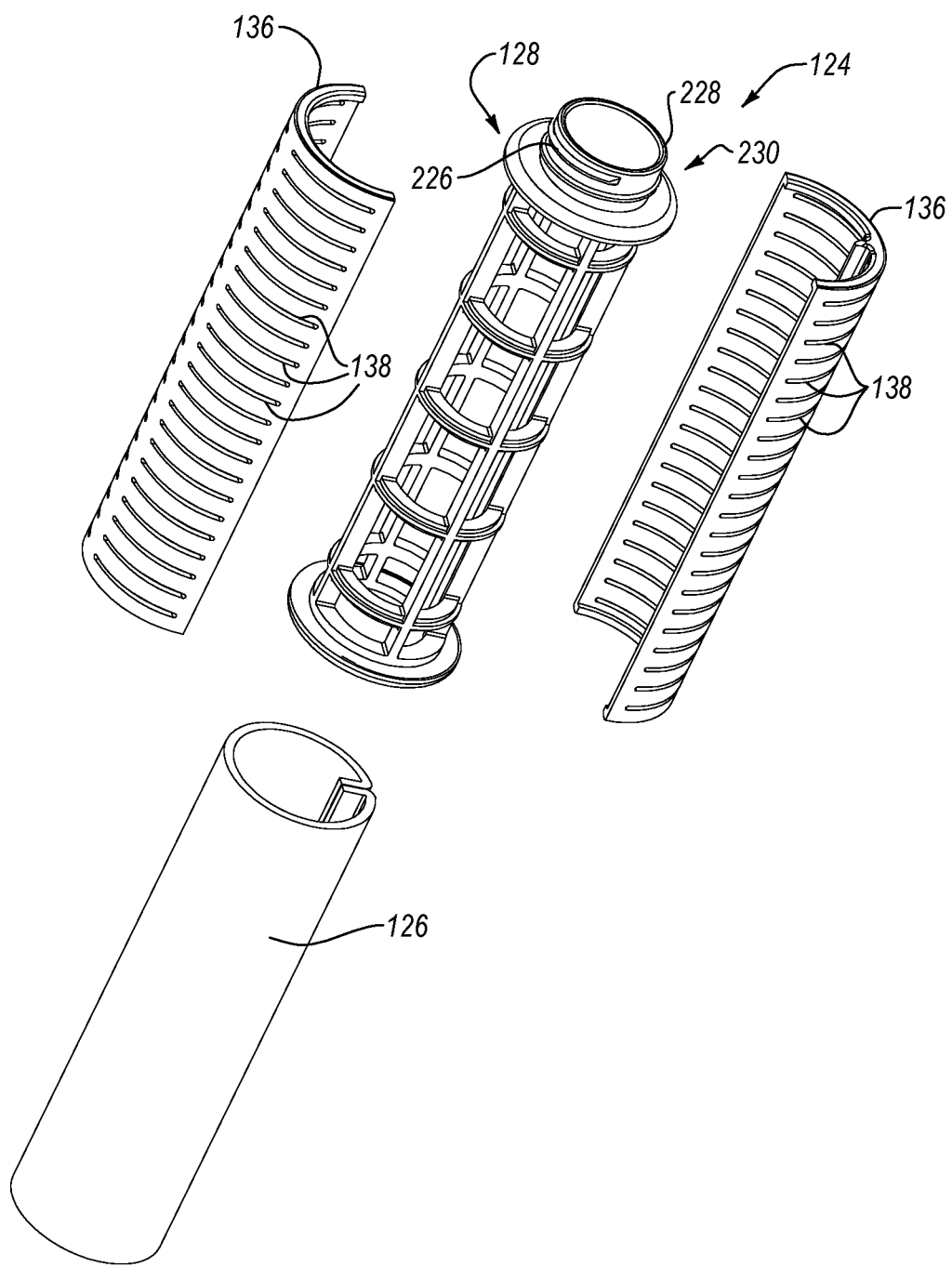
FIG. 2A is an exploded view of an exemplary embodiment of a filter assembly.

Filter assembly 124 may be releasably attachable to a bottom surface 218 of the lid body 110 through a thread and groove structural arrangement, as seen in FIGS. 1B and 2A. For example, threads 226 of assembly 124 may screw into corresponding grooves 224 of lid body 110, around or within outlet 108. In some embodiments, filter assembly 124 is releasable from container body 102 or lid body 110, so as to allow removal of filter assembly 124, e.g., when replacement of filter assembly 124 is needed, or removal is otherwise desired. In an embodiment, system 100 may only filter water as water is poured out of the container body 102, so that no filter is disposed within inlet 112, and no delay is associated with filling storage volume 104.

In illustrated system 100, internal storage volume 104 that is defined by container body 102 is undivided, so as to not include a reservoir compartment for unfiltered water and another compartment for filtered water, with a filter assembly disposed between the two compartments.

Figure 1C:
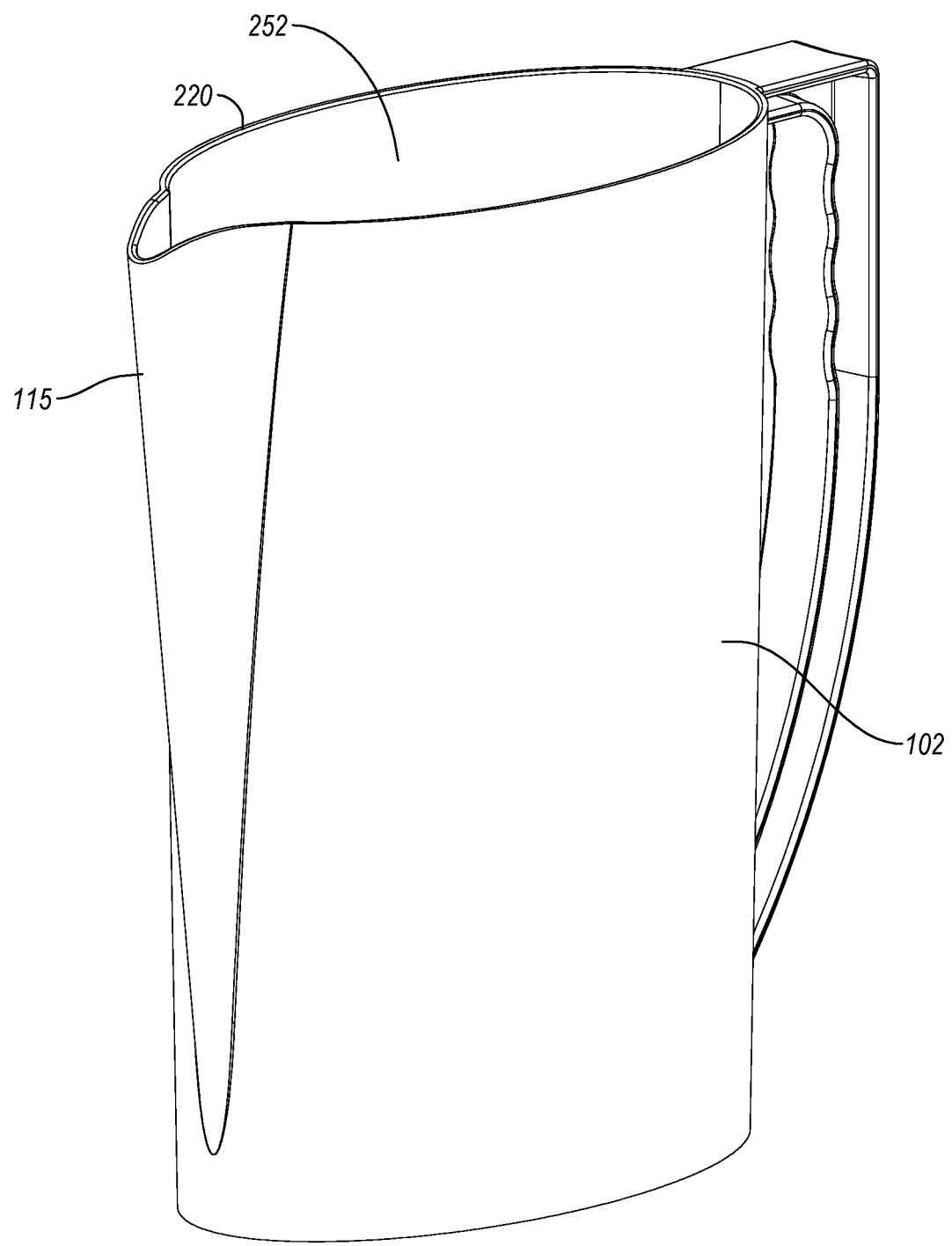
FIG. 1C is a perspective view of an exemplary container body for a filter-as-you-pour system, e.g., configured for use with the lid body of FIG. 5A.

As shown in FIGS. 1B and 1C, lid body 110 and container body 102 may respectively comprise complementary locking structures configured to releasably engage one another so that lid body 110 may be selectively and releasably attached to (e.g., over) container body 102.

FIG. 1B shows a bottom perspective view, showing the underside of lid body 110, and FIG. 1C shows container body 102, separate from lid body 110. Lid body 110 is shown as including a downwardly tapered lip 109 extending generally perpendicular from bottom surface 218, which interfaces with the top inner sidewall 252 of container body 102. The downwardly tapered lip 109 may be generally perpendicular to bottom surface 218. The downwardly tapered lip 109 may extend around the entire outer perimeter edge 214 of the lid body 110. The downwardly tapered lip 109 may form a closed perimeter loop 242 concentric within outer edge 214 of lid body 110. The downwardly tapered lip 109 has an inner surface 244, an outer surface 246 (which interfaces with container surface 252), and a bottom surface 248.

In the embodiment of FIG. 1B, the downwardly tapered lip 109 is slightly inset relative to outer edge 214 of the lid body 110, so that a portion 216 of bottom surface 218 of lid body 110 is located outside of the perimeter loop 242 defined by lip 109. In other words, the distance around loop 242 is slightly less than the distance around the outer edge 214 of the lid body 110. The inner surface 244 and outer surface 246 may each connect to the bottom surface 218 at substantially a 90° angle, e.g., slightly less than 90° between surface 244 and surface 218, and slightly more than 90° between surface 246 and surface 218 due to the tapering of lip 109. For example, these angles may deviate from perpendicular by about 5° or less.

The portion 216 of bottom surface 218 located outside of downwardly tapered lip 109 may correspond in dimensions and shape to top 220 of container body 102. When lid body 110 is placed on top of container body 102 (e.g., as seen in FIG. 1A), there may be a friction fit between inner sidewall 252 of container 102, and surface 246 of lid body 110. This friction fit structure of lid body 110 and container body 102 are an example of complementary locking structures.

Inner surface 252 and/or surface 246 may be grooved, ribbed, or have other textures that facilitate locking between the container body 102 and lid body 110 as lid body 110 is placed over the open top of container body 102. One or more of these surfaces may also comprise a material that is assists with gripping the other surfaces, such as a rubber, silicone, or other elastomeric material.

Figure 1D:
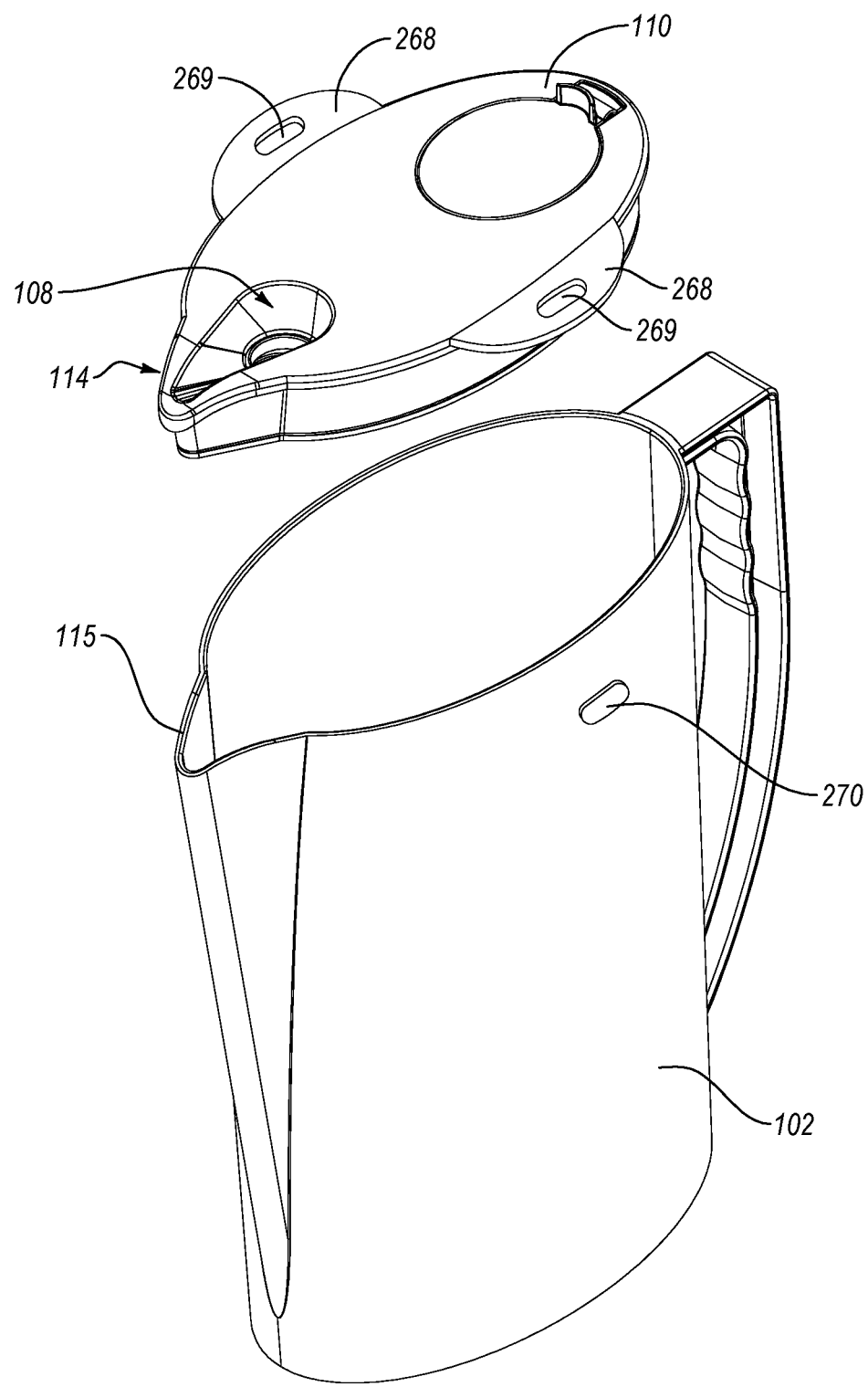
FIG. 1D is an exploded perspective view of another embodiment of a lid body and container body illustrating an example of complementary locking structures for releasably securing the lid body over the container body.

As shown in FIG. 1D, the locking means may comprise one or more locking members 268 located on container lid 110 with a corresponding ridge 270 located on the container body 102. The locking members 268 may connect to the top surface of lid body 110.

The locking members 268 may include a recess 269 corresponding to ridge 270, so as to snap onto the ridge 270 to lock the lid body 110 onto the container body 102. When snapped over ridge 270, ridge 270 may be received within recess 269. Corresponding locking members 268 and ridges 270 may be provided on opposed sides of container body 102. The lid body 110 may be easily removed from container body 102 by pulling the locking members 268 away from ridges 270 and then lifting up lid body 110. Various other complementary locking structures between the lid body and container body may be employed. Additional details of exemplary lids and locking structures are disclosed in U.S. Pat. No. 10,125,027, herein incorporated by reference in its entirety.

Figure 2B:
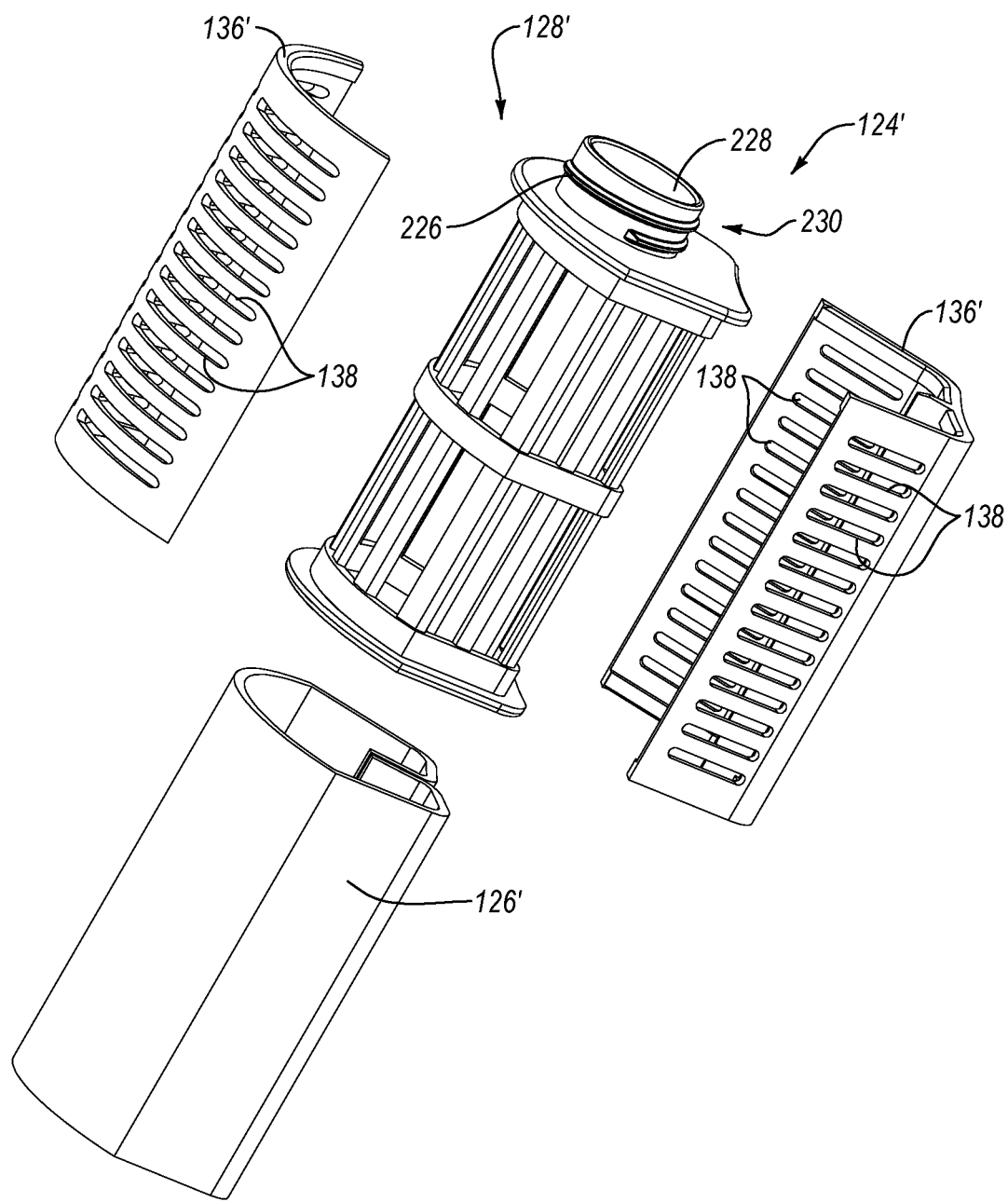
FIG. 2B is an exploded view of another exemplary embodiment of a filter assembly.

FIGS. 2A and 2B illustrate exemplary filter assemblies that may be employed in system 100. The filter media 126 of filter assembly 124 may comprise an activated carbon textile material that presents a curved surface to water passing through filter assembly 124. Filter assembly 124 may be a gravity flow filter. The activated carbon textile material 126 may be wrapped around a hollow core frame member 128 of filter assembly 124, so that the flexible, fibrous textile material 126 presents a curved surface to water entering filter assembly 124. A casing or shell 136 may be disposed about core frame member 128, sandwiching textile material 126 between shell 136 and core frame member 128. As shown, shell 136 may include slots 138 disposed therein, so as to allow water to be filtered by assembly 124 to enter filter assembly 124. Frame member 128 is shown as including threads 226 at a top end 230 thereof, on cylindrical neck 228, which may screw into corresponding grooves 224 formed into ring shaped coupling structure 232 of lid body 110.

FIG. 2B illustrates another filter assembly configuration 124', where the front face of filter assembly 124' is curved. It will be readily apparent that various filter assembly configurations may be employed. The filter assembly 124' has a core frame member 128' textile filter media material 126', and casing or shell 136' with slots 138. Additional details of exemplary filter assemblies, including filter media and filter housings are disclosed in U.S. Pat. No. 10,035,713; U.S. Publication No. 2016-0376161; and U.S. Publication No. 2016-0376162, each herein incorporated by reference in its entirety.

Figure 3:
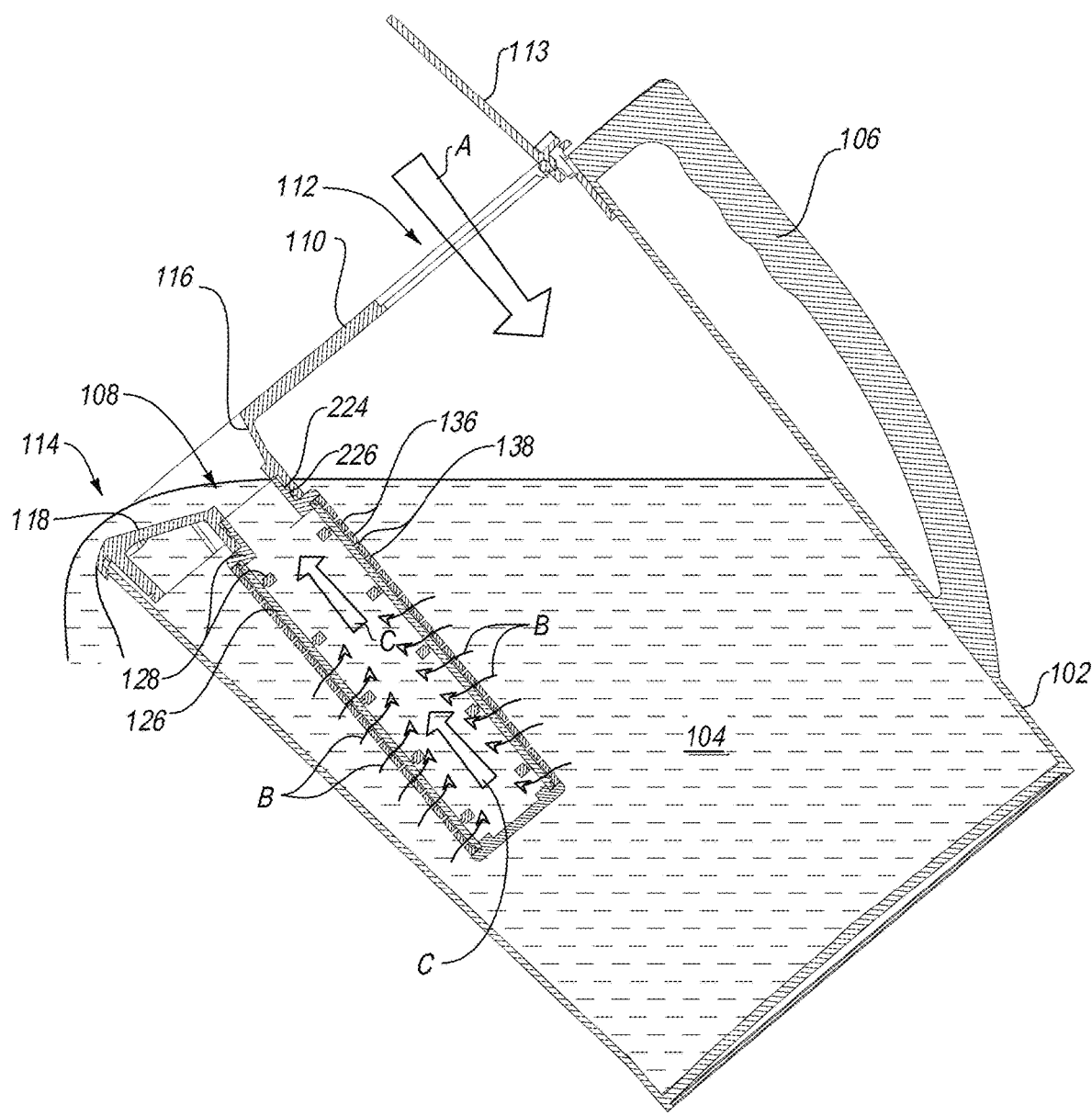
FIG. 3 is a cross-sectional schematic view of the filter-as-you-pour system of FIG. 1, showing the flow of water into and out of the system.

As shown in FIG. 3, the filter assembly embodiments shown in FIGS. 2A and 2B are designed so that water flows into filter assembly from the container body 102 in a radial direction, as represented by arrows B, and flows out towards the outlet 108 in an axial direction, as represented by arrows C. Filter assembly 124 is shown as being generally cylindrical, and filter assembly 124' is shown as providing a curved crescent shaped front surface, and shares the radial flow upon entrance and axial flow upon exit characteristics of filter assembly 124 of FIG. 2A. The filter assemblies shown in conjunction with FIGS. 6A-6C include a further feature which turns the axial flow within the filter assembly to a lateral flow just before exiting the outlet of the system. It will be appreciated that other configurations for the filter assembly may also be employed. In particularly preferred embodiments, the filter assembly includes the described textile material filter media, which is arranged so as to present a curved surface to the incoming flow of water. Such arrangements have surprisingly and unexpectedly been found to provide relatively high flow rates, making a filter-as-you-pour implementation possible from a practical perspective.

In any case, the filter assembly may be configured to filter unfiltered water within container body 102 as it is poured therefrom, while at the same time providing a flow rate of water through outlet 108 that is at least about 0.3 gallons per minute (GPM. In other words, the filter-as-you-pour system 100 may be configured to provide a minimum flow rate of 0.3 GPM. In another embodiment, the flow rate is at least 0.5 GPM. In an embodiment, the filter assembly is advantageously configured to provide and allow for exit flow rates of filtered water from about 0.3 GPM to about 2 GPM, from about 0.3 GPM to about 1 GPM, or from about 0.5 GPM to about 0.8 GPM. Such flow rates are typically not possible with filter assemblies including monolithic block, particulate or granulated filter media typically employed in gravity-fed water filtration systems that include a reservoir into which unfiltered water is introduced, which water then trickles through the filter assembly and into the container body (e.g., pitcher), where it can then be poured therefrom. For example, filter assemblies based on such filter media typically require 3 to 8 minutes to filter 1 liter of water (e.g., corresponding to a flow rate of 0.03 GPM to 0.09 GPM).

The filter assemblies employed in the present invention may advantageously provide for much faster filtration flow rates, such as those above. In an embodiment, the filter media of the filter assembly comprises an activated carbon textile material (i.e., fibrous), which textile material presents a curved surface to the flow stream of water. Such textile materials disposed so as to present a curved surface to the flow stream of water have surprisingly been found to provide and allow for significantly faster flow rates as compared to the 3 to 8 minutes required to filter 1 liter of water provided by other filter media.

FIG. 3 illustrates an exemplary flow path along which the water may pass as it moves through system 100. Water may be introduced into container body 102 through inlet 112 in lid 110, as depicted by arrow A. As shown, advantageously, no filter may be disposed between inlet 112 and storage volume 104, so that unfiltered water may be quickly introduced into container body 102, without any delay associated with a filter disposed between inlet 112 and storage volume 104. Rather than filtering upon entering container body 102, at least some embodiments of the present invention provide for filtering of the water only as it exits through outlet 108. Of course, some embodiments may provide filtering upon entrance and exit, although overall faster flow rates may be possible where filtering is limited to passage through the outlet 108.

When a user tips a pitcher or other container body 102 (e.g., as depicted in FIG. 3), the water may flow into filter assembly 124 along a radial flow path as depicted by arrows B, through one or more layers of fibrous textile filter media 126, which advantageously is disposed so as to present a curved, rather than perpendicular or planar surface to the stream of water. By positioning textile filter media 126 so that at least a portion thereof presents a curved, rather than planar surface, the inventors have surprisingly found that flow rates through the filter media are significantly increased. Once the water passes through layer(s) 126, the filtered water may then flow axially, as represented by arrows C, up towards outlet 108. The filtered water may pass through any flow control device (e.g., a slit valve, grating, etc.) disposed in outlet 108, and over spout portion 118 of lid 110.

Described another way, the filter assembly 124 is configured so that when water passes from storage volume 104 towards outlet 108, the inlet thereto (e.g., slots 138) is disposed about the perimeter of filter assembly 124, while the outlet is aligned with the longitudinal axis of filter assembly 124. Because slots 138 provide a relatively high surface area along which water may enter and penetrate through textile material 126, a high flow rate of water through assembly 124 is possible. The filtered water (having passed through filter media 126) is collected in the central hollow section of core frame 128, and then exits axially towards outlet 108.

In an embodiment, characteristics of textile filter media material 126 may serve to alter the flow characteristics of the stream of water exiting the system, e.g., in combination with any flow control device disposed proximate the outlet 108. For example, in an embodiment, the filter media 126 may comprise a single layer of the activated carbon textile material.

In another embodiment, a second layer may be provided, so that the filter media comprises two layers of activated carbon textile material (e.g., two layers, each about 0.75 mm to about 1 mm in thickness). Similar results may be achieved by increasing the thickness of a single textile layer (e.g., about 1.5 mm to 2 mm rather than a 0.75 mm to 1 mm thick single layer). Providing two layers of textile filter media material 126 (or a thicker single layer) may reduce the flow rate of water through the system as compared to a single layer of a given thickness.

Use of two layers may also increase the filtration effectiveness characteristics (e.g., a higher fraction of removed chlorine) or increase life (e.g., gallons filtered before recommended filter replacement). For example, use of two layers may flatten the curve resulting from a plot of chlorine removal versus gallons filtered (see FIG. 9), providing increased consistency over the life of the filter. In addition, the second layer may be differently configured relative to the first layer, so as to remove different contaminants. For example, a second layer may comprise an ion exchange resin (IER) in fibrous, textile (e.g., felt) form, so as to be disposed within filter assembly 124 in a similar manner as the activated carbon textile material 126, but capable of removing heavy metal contaminants (e.g., copper, cadmium, mercury, lead, etc.).

The textile material 126 may be formed from structural elements selected from the group consisting of fibers, yarns, filaments, flexible porous composites, combinations thereof, etc., which may be woven, non-woven, braided, or otherwise joined into a textile material. Such textile materials may typically be comprised of relatively high aspect ratio structural elements whose length is orders of magnitude (e.g., 1-5 orders of magnitude) larger than the diameter.

Such textile materials also may have varying degrees of structural integrity based on the amount, size, and distribution of the structural elements. For example some textile structures may have the structural elements loosely held generally parallel to each other while in other embodiments the structural elements may be twisted around a longitudinal axis or they may be interlaced orthogonally relative to each other or they may be randomly oriented relative to each other. The physical dimensions and orientation of the structural elements of the textile material also create a depth to thickness ratio for the resulting textile material, along with pores of various sizes.

For best use in water filtration applications these textile materials preferably may have an optimal combination of thickness and pore size distribution to not only allow water to flow at the desired flow rate, but also contain enough mass of material to enable desired levels of contaminant reduction, while having enough physical integrity to prevent the structural elements the textile material is made of from being dislodged by the water penetrating through it.

By way of non-limiting example, a textile material employed as filter media 126 may have properties as shown in Table 1 below.

TABLE 1

| Property | Specification |
| --- | --- |
| Basis Weight | 25-200 g/m$^2$ |
| Thickness | 0.5-5.0 mm |
| Iodine Number | 500-3000 mg/g |
| Pore size distribution (avg.) | 5-1000 μm |
| Fiber diameter (avg.) | 1-50 μm |

The filter media textile material 126 is fibrous, e.g., fibers, filaments, or other structural elements of the material may be matted, woven, braided, or otherwise joined together. Such a fibrous material exhibits very high porosity characteristics, and in combination with the large inlet surface area provided by slots 138, allows and provides for the relatively high flow rates of water therethrough, as described herein. Such porosity and associated flow rate characteristics are not possible with traditionally employed filter media, such as monolithic activated carbon block, a bed of activated carbon granules or particles.

Although filtering foam filter media may offer gravity fed flow rates therethrough that are higher than those possible with granulated or monolithic activated carbon, such foam filter systems are not particularly efficient in removing chlorine or other contaminants. For example, more foam material is required to achieve a desired target removal efficiency. For example, foam media may remove only about ⅓ as much chlorine in a single pass under typical use conditions. As a result, products relying on filtration using a foam filter media pass the water through the foam filter media both upon entry and exit from the container in order to achieve an acceptable level of contaminant removal efficacy. Employing the fibrous activated carbon textile material as described herein advantageously is capable of achieving contaminant removal efficacy (e.g., at least 80%, at least 85%, at least 90%, at least 95%, or at least 99% chlorine removal) that is comparable to that achieved by products employing monolithic or granulated activated carbon filter media (e.g., about 3 times greater than that provided by foam), but at flow rates that are significantly higher (e.g., at least about 0.3 GPM) than granulated activated carbon, which makes practical implementation of a filter-as-you-pour container system possible.

Stated another way, the filter-as-you-pour systems of the present invention employ a textile filter media material arranged so as to present a curved surface to inflowing water to be filtered. The configurations allow for relatively compact filter assemblies capable of providing performance equivalent or similar to larger (e.g., greater surface area of filter media) or multi-stage systems. The filter-as-you-pour system places textile filter media material in the path of water flowing out from the container body under gravity-flow conditions. Under such conditions, with a known porous filter material constant bulk density, Darcy's law applies:

$$k = \frac{QL\mu}{\rho g A \Delta P}$$

| Symbol | Variable | Typical Units Metric (English) | Typical Operating Range | |
|---|---|---|---|---|
| k | Intrinsic Permeability | cm/s (ft/s) | $1.2 \times 10^{-7}$-$3.7 \times 10^{-4}$ | ($4 \times 10^{-9}$-$1.2 \times 10^{-5}$) |
| Q | Flow Rate | L/min (gal/min) | 0.75-7.5 | (0.2-2.0) |
| L | Path Length | cm (in) | 0.1-0.5 | (0.04-0.2) |
| μ | Dynamic Viscosity | g/cm-s (lbf/ft-s) | 0.9-1.4 | (0.06-0. |
| ρ | Fluid Density | g/cm$^3$ (lb/ft$^3$) | 1.00 | (62.4) |
| G | Gravity Acceleration | cm/s$^2$ (ft/s$^2$) | 980.665 | (32.174) |
| A | Surface Area | cm2 (ft$^2$) | 50-650 | (0.05-0.60) |
| ΔP | Pressure Differential | cm H$_2$O (lb/in$^2$) | 5-15 | (0.07-0.22) |

Figure 9:
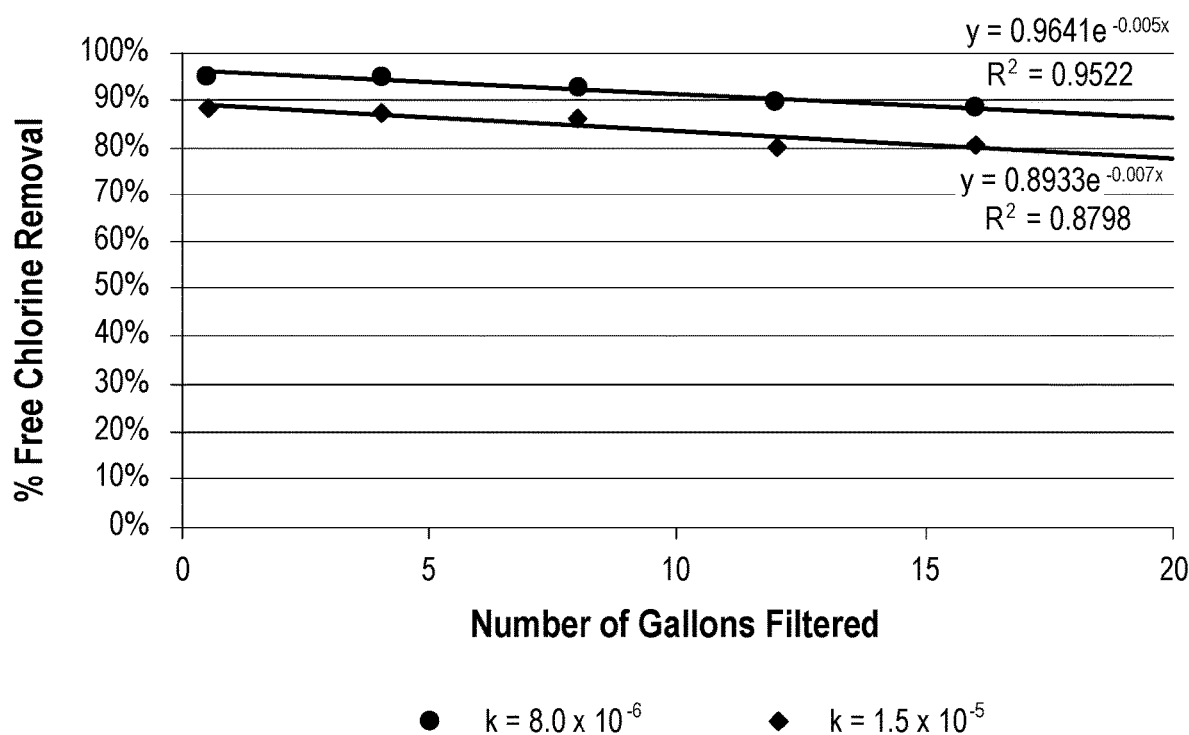
FIG. 9 is a graph illustrating how free chlorine removal may decrease with increasing throughput.

For a given filter material density and associated permeability, the removal efficiency for a given water contaminant (e.g., chlorine) can be related directly to the mass load of that constituent over time. For a constant influent concentration (e.g., the unfiltered water all includes the same chlorine concentration), removal efficiency can be related to total flow throughput. For a first-order reaction, such as that characteristic of free chlorine degradation or adsorption on activated carbon, this follows an exponential curve. As permeability increases, contaminant removal decreases. The filter-as-you-pour configuration and textile filter media material described has the advantage of providing higher contaminant removal efficiency at higher permeability than alternative methods. Because of these advantages, this allows relatively smaller filtration assemblies, and/or better removal efficiencies. FIG. 9 illustrates exemplary contaminant removal profiles for two different permeability values over a portion of the life of a filter assembly.

Such filter assemblies may have a life of at least about 20 gallons, at least about 30 gallons, at least about 40 gallons, from about 40 to about 80 gallons, etc. At the end of its life the filter assembly may still achieve chlorine removal of at least 60%, at least 70%, or at least 75%. The filter assemblies may meet applicable NSF/AISI 42 standards. As shown in FIG. 9, the contaminant removal efficiency may be relatively consistent over the life of the filter assembly (e.g., within ±30%, within ±25%, within ±20%, within ±10%, or within ±5% of a lifetime average removal efficiency.

Figure 5A:
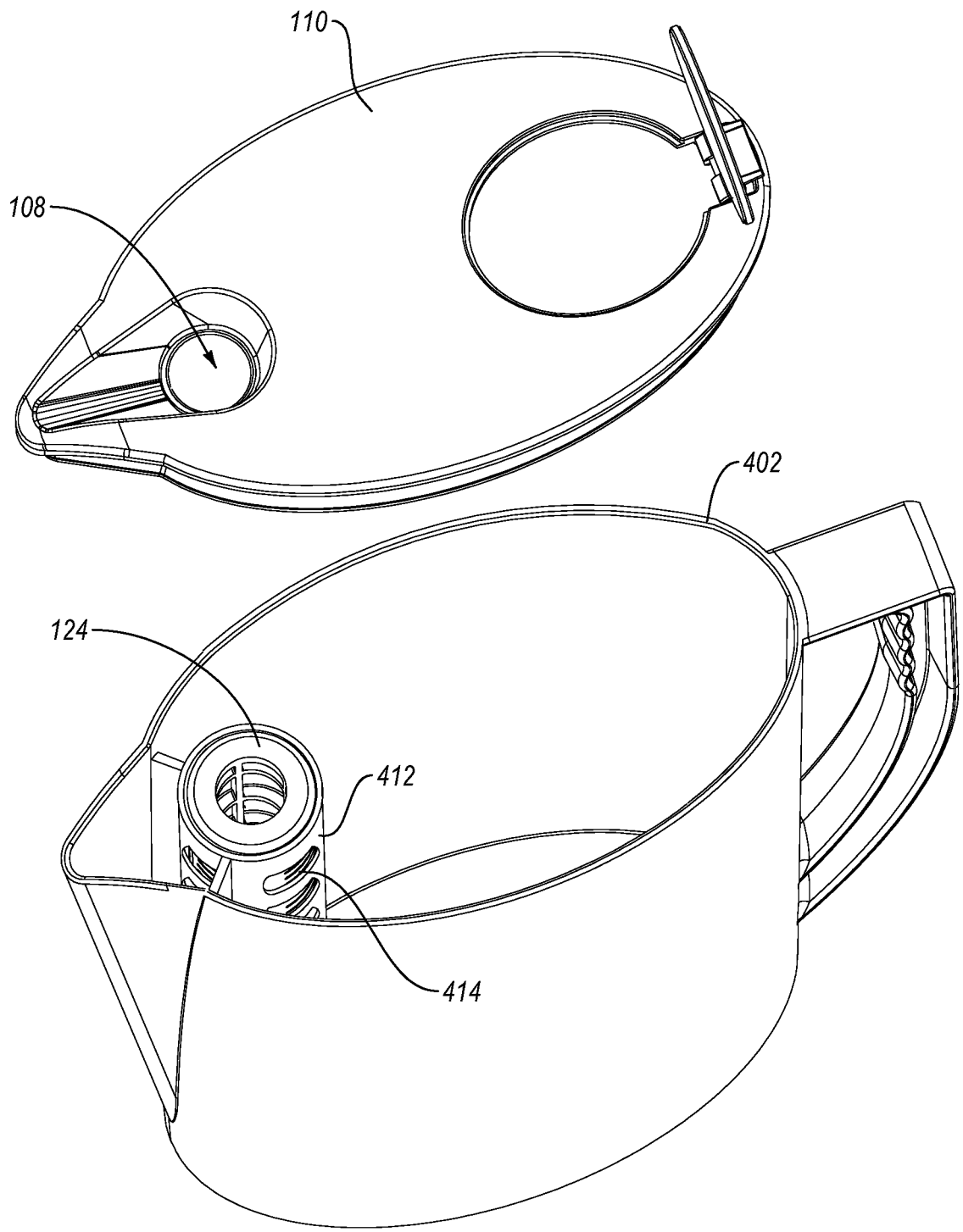
FIG. 5A is an exploded perspective view of an embodiment of a filter-as-you-pour system where the filter assembly is attachable to the container body.

The filter assembly 124 of FIG. 3 is shown as attached to lid 110 (e.g., through any suitable releasable attachment mechanism, such as the illustrated threaded connection). In another embodiment, the filter assembly may be releasably attached to or associated with the container body of the system. An example of such a configuration is shown in FIG. 5A, described below.

Figure 4A:
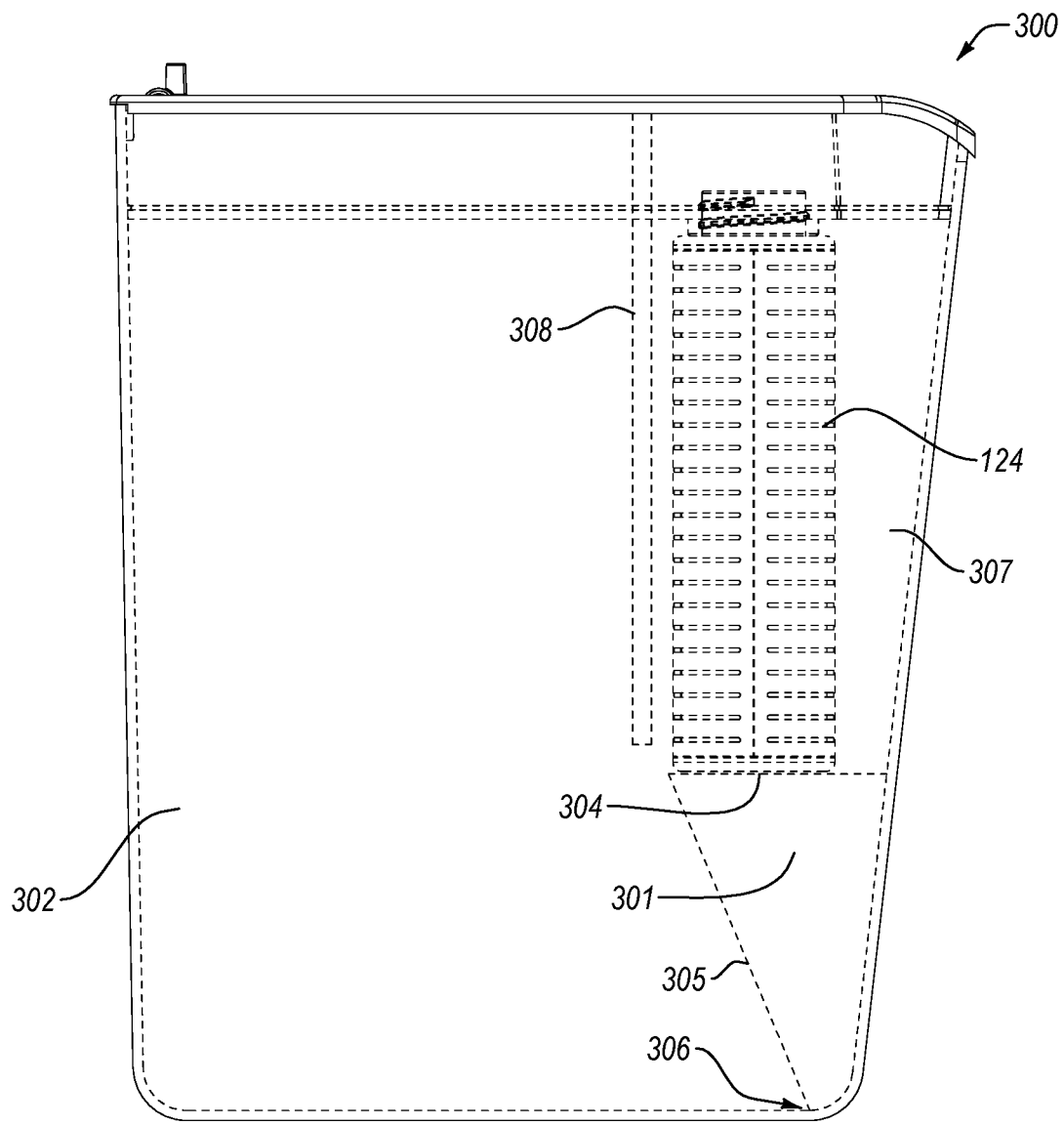
FIG. 4A is a side view of another embodiment of a filter-as-you-pour system.

In some embodiments of the filter-as-you pour systems, the container may include features to minimize the presence of any residual water that may be difficult to pour from the container body, through filter assembly 124 and outlet 108. FIG. 4A shows one embodiment of a filter-as-you-pour system 300 that is configured to minimize any residual water in container body 302. Container body 302 of FIG. 4A has a ledge 301 that may be disposed directly below the generally vertically oriented filter assembly 124 and affixed to an inner surface of the container body 302. The ledge 301 may be integral with container body 302, or may be a separate molded or otherwise formed piece that attaches to container body 302. The ledge 301 in FIG. 4A has a top end 304 that may form a planar surface with approximately the same length and width as the bottom end of filter assembly 124. The ledge 301 may taper towards an adjacent sidewall or a bottom corner 306 of container body 302. Such a configuration may aid water that collects adjacent corner 306 to ride along tapered edge 305 until it falls into the chamber 307 in which filter housing 124 is housed.

A shield 308 may be provided adjacent to the filter assembly 124, as shown in FIG. 4A, above ledge 301. Shield 308 may extend or hang from the bottom surface of the lid body. Shield 308 may be generally planar or may curve about filter assembly 124. The combination of a shield and ledge may minimize accumulation of residual water in the container body 302 after as much water as practical is poured from the container body 302.

Figure 4B:
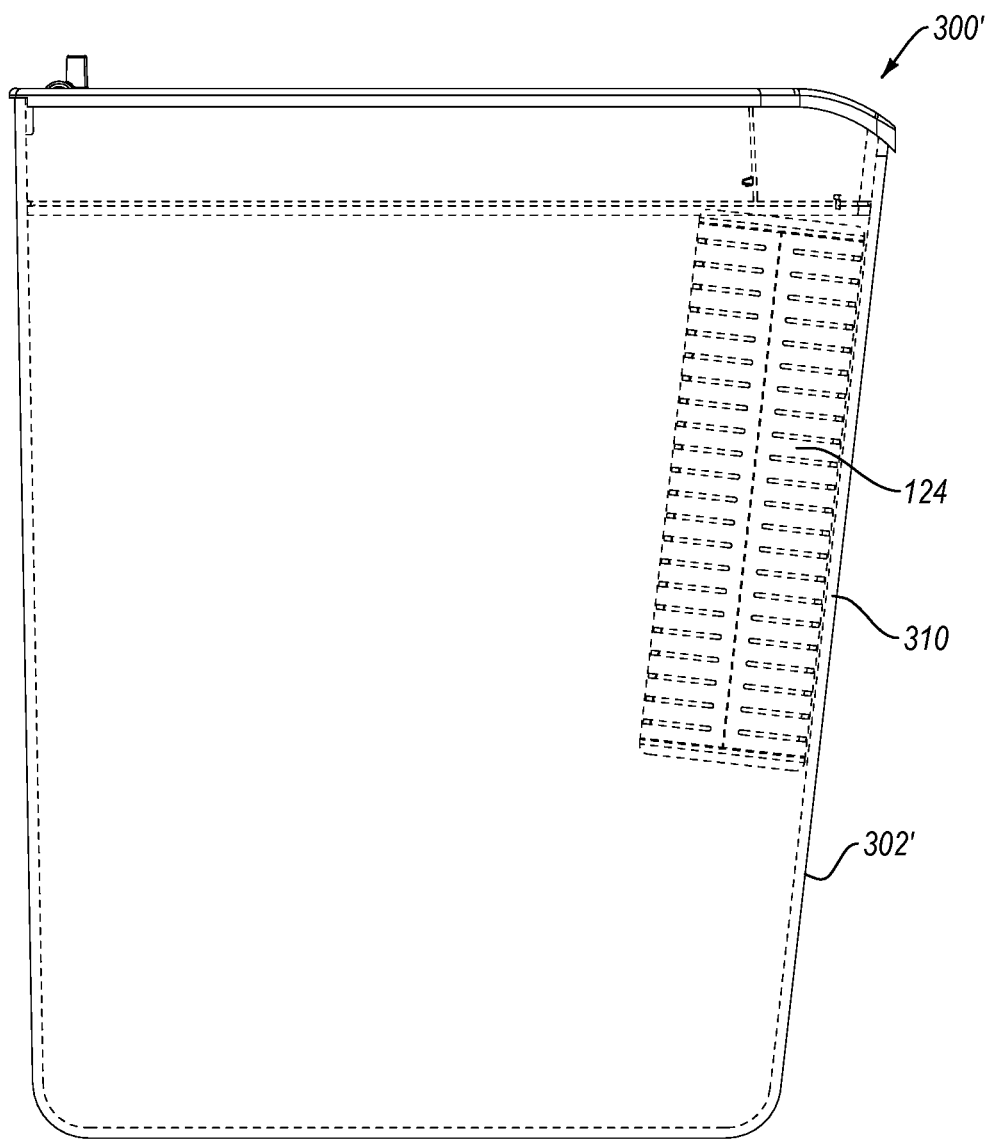
FIG. 4B is a side view of another embodiment of a filter-as-you-pour system.

As shown in FIG. 4B, in another embodiment of a system 300', the filter assembly 124 may be configured to be located flush against the front end 310 of container body 302'. In such an embodiment, when water is poured from container body 302', there is substantially no gap or space between the filter assembly 124 and container body 302' for residual water to collect in. This may also minimize the presence of residual water located in the container body once all water that can be poured from the container as a practical matter has been poured therefrom.

Instead of or in addition to being attached to a lid body, the filter assembly may be attached to the container body. For example, in the embodiment shown in FIG. 4B, the filter assembly 124 may be attached to the front sidewall 310 rather than, or in addition to the lid body.

FIG. 5A illustrates another embodiment where the filter assembly 124 may be attached to structure of the container body, rather than the lid body 110. For example, container body 402 may include a receptacle 412 (e.g., a cage) into which the filter assembly 124 may be received. Receptable 412 of container body 402 may include slots 414 disposed therein to allow water within container body 402 to pass through the wall of receptable 412, and into slots 138 of filter assembly 124. Water may flow through filter assembly 124 in a similar manner as described above in conjunction with FIG. 3.

Figure 5B:
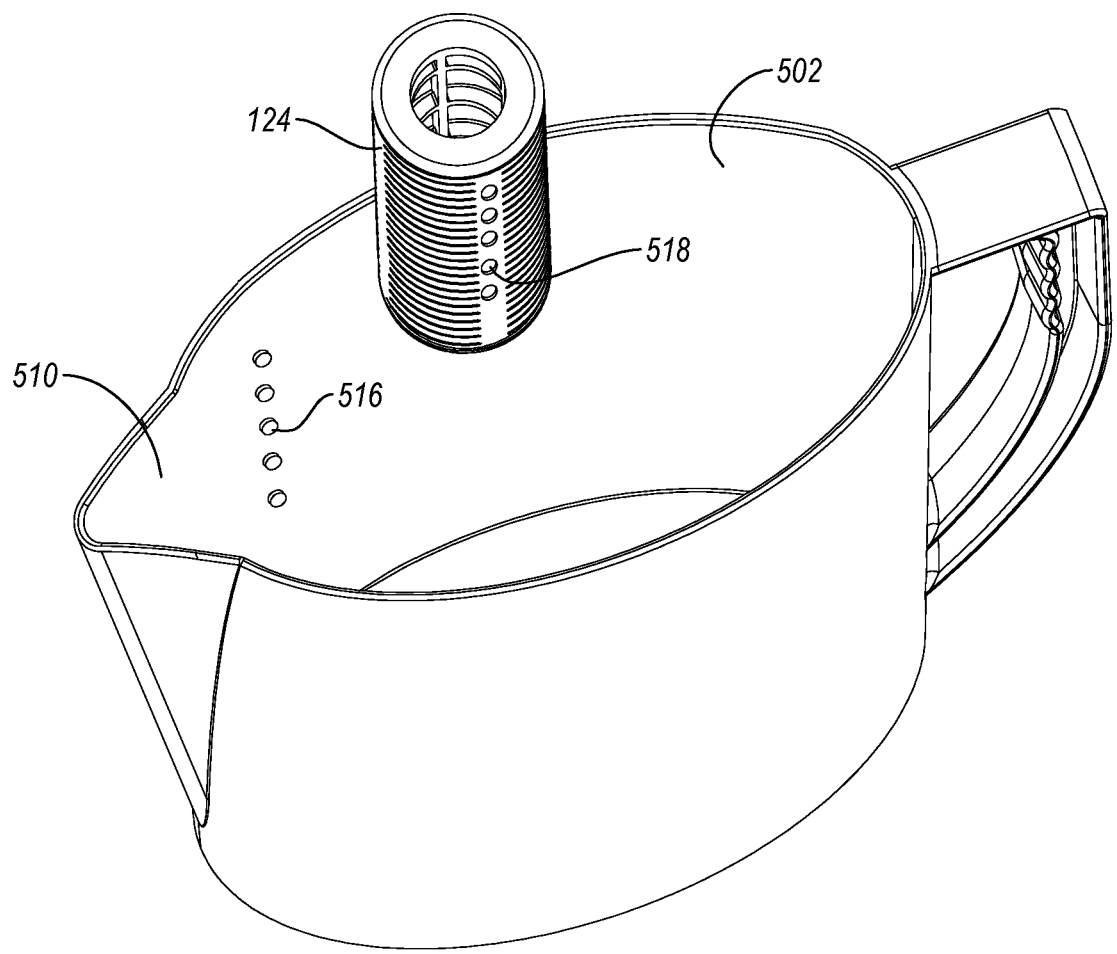
FIG. 5B is an exploded perspective view of another embodiment of a container body for a filter-as-you-pour system where the filter assembly is attachable to the container body.

As shown in FIG. 5B, the filter assembly may be attached to the sidewall 510 (e.g., near the front end of container body 502) by another mechanism. For example, container body 502 may be configured to have at least one protrusion (e.g., circular protrusion) 516, and the filter assembly 124 may be configured to have at least one corresponding recess or hole 518 into which the protrusion 516 is configured to fit, similar to the retaining mechanism employed by LEGO blocks. The filter assembly 124 may be positioned so that the protrusions 516 align with holes 518, and then the filter assembly 124 may be pressed against the container body 502 so that the protrusions 516 snap into the holes 518, locking the filter assembly 124 into place. Of course, the positions of the protrusions and recesses could be reversed (e.g., protrusions on filter assembly 124, and recesses in sidewall 510 of container body 502).

Figure 6A:
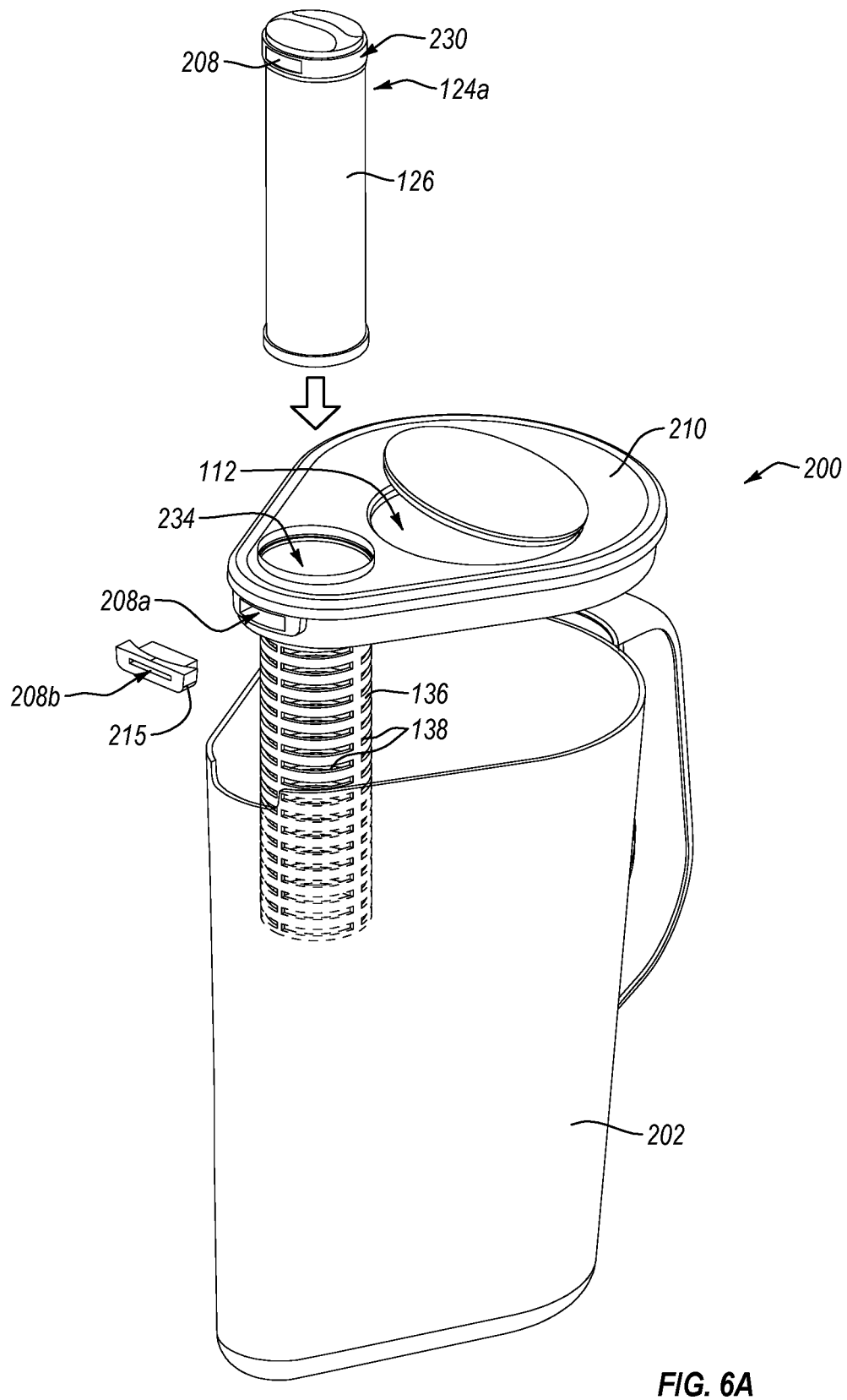
FIG. 6A is an exploded perspective view illustrating another exemplary embodiment of a filter-as-you-pour system.
Figure 6B:
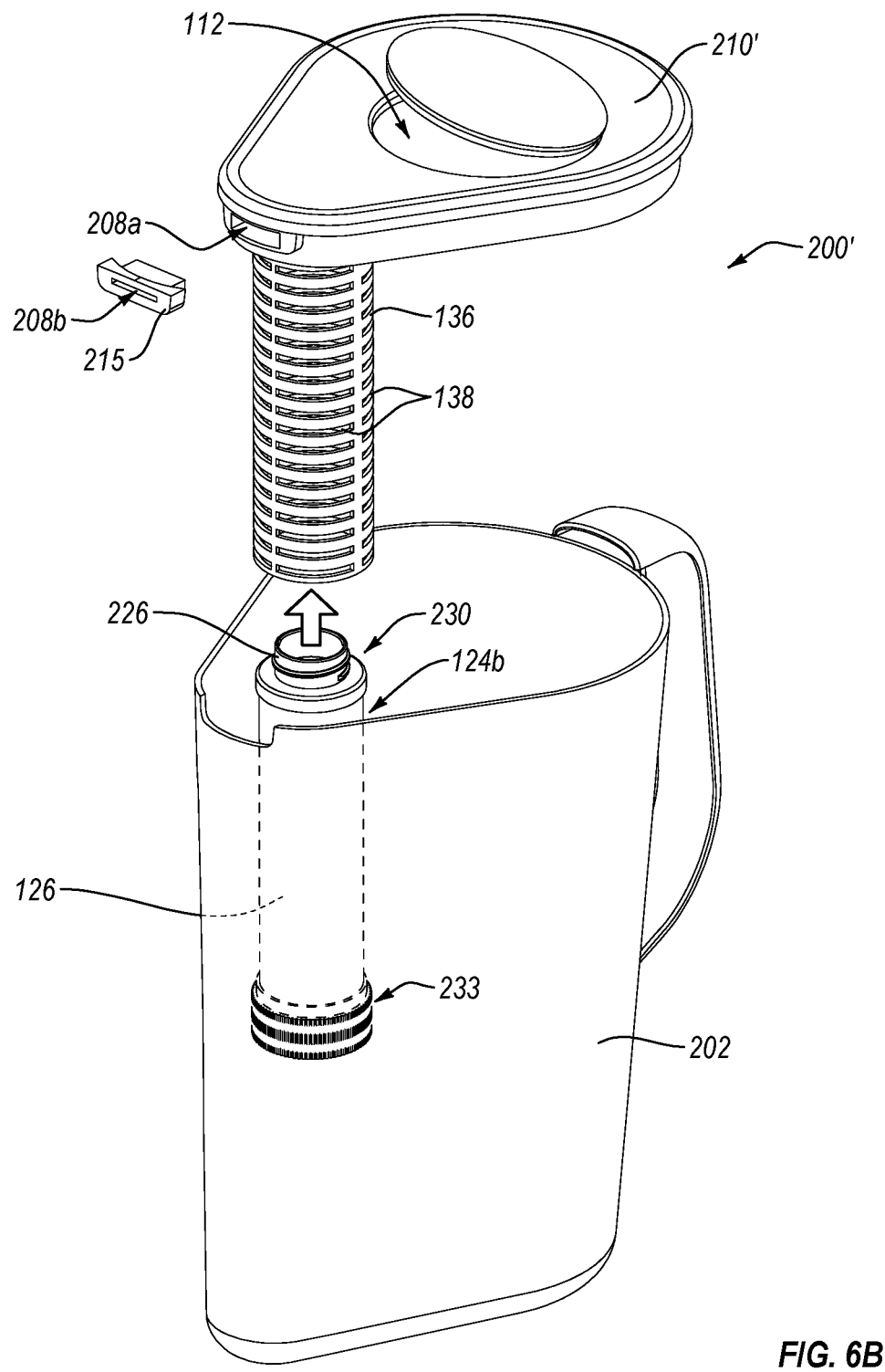
FIG. 6B is an exploded perspective view illustrating another exemplary embodiment of a filter-as-you-pour system.
Figure 6C:
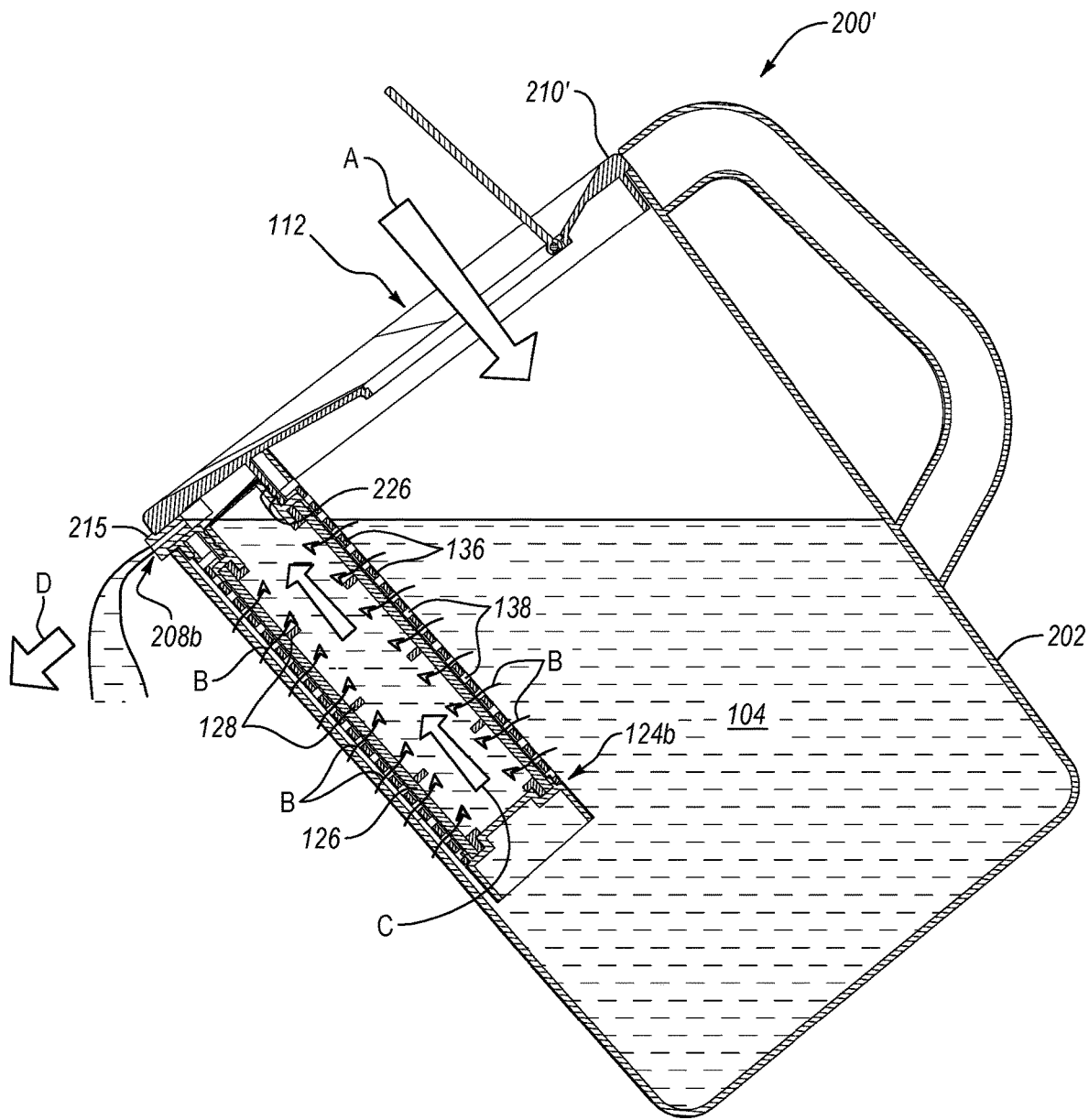
FIG. 6C is a cross-sectional schematic view through an assembled filter-as-you-pour system similar to that of FIG. 6B, showing the flow of water in and out of the system.

FIGS. 6A-6B illustrates an exemplary configuration where the filter assembly may be inserted from the top down, or from the bottom up, respectively. Both configurations shown in FIGS. 6A-6B include a particular lid and spout configuration that permit exiting water to flow out of the system in a direction that is radial relative to the filter assembly. FIG. 6C illustrates a cross-section through the system of FIG. 6B.

As seen in FIG. 6A, a system 200 may include a container body 202, a lid body 210, and a filter assembly 124a, which may be inserted from the top down (e.g., dropped down) into casing or shell 136, which includes slots 138. Filter assembly 124a may be trapped between a bottom of casing or shell 136 and lid body 210, upon insertion therein. For example, a top end of filter assembly 124a may snap into or otherwise be secured into lid body 210. A top end of shell 136 may be threaded, snapped, or similarly secured into lid body 210. In another embodiment, the filter assembly 124a could be screwed or similarly secured (e.g., snapped) into a bottom of shell 136, etc. An opening 234 not for exit of filtered water, but for insertion of filter assembly 124a may be provided (e.g., towards the forward end of) in lid body 210. Opening 234 is plugged or sealed upon insertion of filter assembly 124a into shell 136.

Filter assembly 124a may be similar to assembly 124 of FIG. 2A, e.g., including a core about which textile filter media material 126 is wrapped, providing a generally cylindrical shape. The top end 230 of filter assembly 124a may be somewhat differently configured than assembly 124, e.g., so as to provide for exit of filtered water in a radial or lateral direction, rather than coaxial with the longitudinal axis of the assembly 124a. For example, within the interior of filter assembly 124a, the top end 230 may be closed, while outlet 208 for exiting filtered water may be provided in a lateral side of top end 230 of filter assembly 124a. A corresponding outlet portion 208a may also be provided in lid body 210, in-line with outlet 208 of filter assembly. So that filtered water exiting filter assembly 124a through outlet 208 then enters outlet portion 208a of lid body 210. A spout 215 may be inserted including another outlet portion 208b may be inserted and retained within outlet portion 208a, so that filtered water exiting outlet 208 flows through outlet portions 208a and 208b, then exiting the system 200.

Spout 215 may be configured (e.g., in cross-sectional area, other geometric characteristics, etc.) to serve as a flow control device, to regulate flow out of system 200 to a desired flow rate, as described herein. Spout 215 may redirect filtered water flow exiting axially from the filter assembly, and may control and ensure water exits along a guided flowpath. The interior pathway defined by spout 215 (e.g., outlet 208, 208a, and to 208b) may be tapered in cross-sectional area and/or width, narrowing towards exit 208b. Such a spout 215 has been found to be helpful in providing consistent flow rates over the volume of water dispensed by the container body (e.g., so that the flow rate when dispensing the first cup from a full container is substantially equal to the flow rate when dispensing the last cup from a nearly empty container. For example, flow rates may be within ±30%, ±25%, ±20%, ±10%, or ±5%, over the entire volume of the container. Additional details of such flow regulation are described in U.S. Pat. No. 10,351,442, already incorporated by reference.

FIG. 6B illustrates a similar system 200' including a lid body 210' to which shell 136 may be secured. In the embodiment seen in FIG. 6B, filter assembly 124b may also be similarly configured to filter assembly 124, e.g., including a core about which textile filter media material 126 is wrapped, providing a generally cylindrical shape. Rather than being inserted from above as in FIG. 6A, the filter assembly 124b may be inserted into shell 136 from below. As shown, a top end 230 of filter assembly 124b may include threads 226 for threading filter cartridge 124b into corresponding grooves of lid body 210'. Alternatively, top end 230 could snap into lid body 210. The bottom end 233 of filter assembly 124b may be provided with a ribbed outer surface to facilitate screwing of filter assembly 124b into lid body 210'.

A spout 214 similar to that described in conjunction with FIG. 6A may also be provided, inserted within an outlet portion 208a in lid body 210', so that water exits system 200' through outlet 208b in a direction that is radial or lateral relative to the longitudinal axis of filter assembly 124b received within shell 136. For example, both FIGS. 6A and 6B illustrate configurations in which the water enters through an inlet 112 in a top of the lid body, but in which water exits the system in a lateral, perpendicular direction, rotated about 90° relative to inlet 112, rather than exhibiting an inlet and outlet that are parallel to one another (e.g., inlet 112 and outlet 108 of FIG. 1 are parallel to one another, while inlet 112 and outlet 208b of FIGS. 6A-6B are perpendicular to one another).

FIG. 6C shows a cross-sectional view through the assembled system 200' of FIG. 6B illustrating an exemplary flow path, similar to that shown in FIG. 3. The system 200 of FIG. 6A may include a similar flow path as that shown in FIG. 6C. As shown, unfiltered water may be introduced into container body 202 through inlet 112 (arrow A), flow into filter assembly 124b along a radial flow path as depicted by arrows B, through one or more layers of textile material filter media 126, which advantageously is disposed so as to present a curved, rather than perpendicular or planar surface to the stream of water. Once the water passes through layer(s) 126, the filtered water may then flow axially, as represented by arrows C, up towards outlet 208b. In order to exit outlet 208b, the filtered water is again turned, flowing laterally outward (arrow D). Before finally exiting outlet 208b, the filtered water may pass through any additional flow control device (e.g., a slit valve, grating, etc.) disposed adjacent the outlet.

FIGS. 7A-7B shows another configuration for a container body and corresponding lid body. FIG. 7A shows a circular lid body 610. The lid body 610 may include grooves 620 in the inner surface 644 of downward facing lip 609, which is illustrated as ridged on its outer surface 646. FIG. 7B shows a corresponding container body 602. Its top end 622 and outlet is also circular, and includes threads 624 on its outer surface, near top end 622. The diameter D of lid body 610 may generally correspond to the diameter D of container body 602, so as to allow lid body 610 to be screwed over container body 602.

The threads 624 and corresponding grooves 620 may be configured to accommodate each other so that by screwing the round lid body 610 onto the round opening of container body 602, the lid body 610 and container body 602 may be firmly attached together. This structure of the lid body 610 and container body 602 are another example of complementary locking structures. In such embodiments, the filter assembly 124 may screw into or otherwise attach at the center of the lid body 610. In another embodiment, it may be off-center.

It will be appreciated that container body 602 and lid body 610 of FIGS. 7A-7B represent an example of a container system in which the inlet and outlet 108 may be one and the same. In other words, unfiltered water may be introduced into the system through the same single opening 108, as through which filtered water exits. In such an embodiment, the filter assembly (e.g., 124—see FIG. 2A) coupled into lid 610 proximate combined inlet/outlet 108 may serve as a dual pass filter, such that water enters the system through combined inlet/outlet 108, axially enters filter 124 in a direction and location aligned with its longitudinal axis, and then exits filter assembly 124 radially through textile filter media material 126, and slots 138, entering container body 602. Upon exit from container body 602 the path is reversed, following the same flow regimen described above in conjunction with FIG. 3, by which reentry into the filter assembly 124 is in a radial direction, through slots 138 and textile material 126. Once in the central longitudinal portion, flow is axial, towards combined inlet/outlet 108. Of course, if desired, the container body 602 may be filled with unfiltered water with lid 610 removed, and lid (and filter assembly 124) attached thereto may be screwed over container body 602 once the container body has been filled. For such use, the filter operates only as a single pass filter.

The container body employed with the present inventive systems may take any of various forms. Various pitcher embodiments are shown and described in conjunction with FIGS. 1A-5B, while a water bottle shaped container is shown in and described in conjunction with FIGS. 7A-7B. FIGS. 8A-8D illustrates various other embodiments.

Figure 8A:
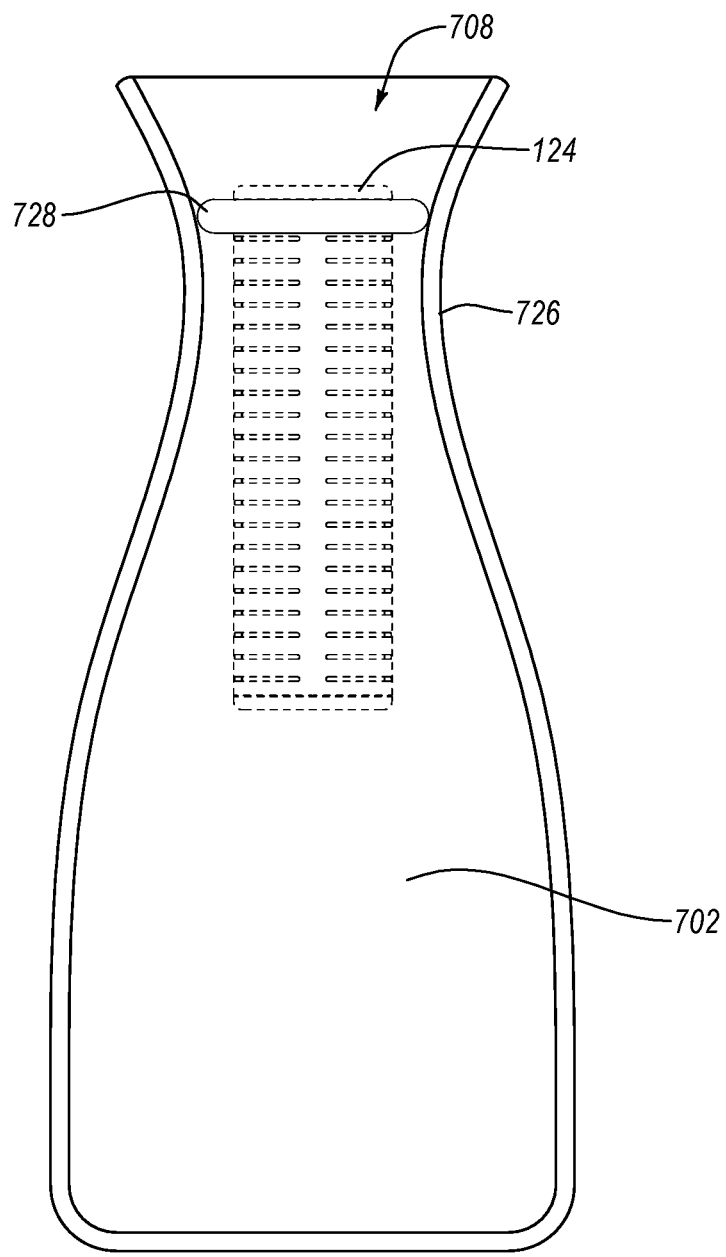
FIG. 8A illustrates an embodiment of a filter-as-you-pour system, where the container body is configured as a carafe.
Figure 8B:
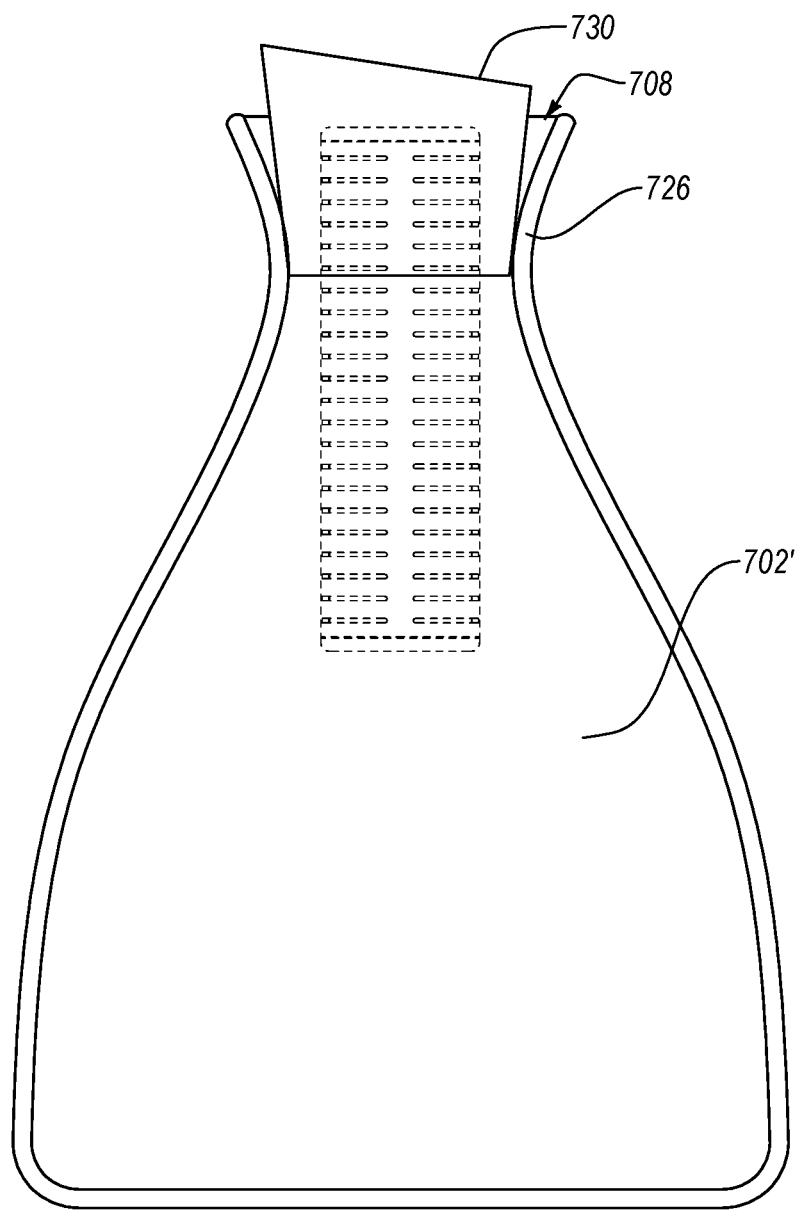
FIG. 8B illustrates another embodiment of a filter-as-you-pour system where the container body is configured as a carafe.

For example, FIGS. 8A-8B illustrates container bodies that may not necessarily include a lid, and in which a combined inlet and outlet may be provided. The embodiment shown in FIG. 8A may include a rubber or other elastomeric band 728 that extends around filter assembly 124, so as to prevent bypass around filter assembly 124 when filter assembly 124 and band 728 is placed into mouth 708 of carafe container body 702. Band 728 and attached or retained assembly 124 may fit partway into container body 702, and may sit within the narrowest part of neck 726. Filter assembly 124 and band 728 may be removed together (e.g., when filling carafe 702). For example, a user may fill container body 702 with band 728 and attached filter assembly 124 removed from container body 702, allowing for more rapid filling of container body 702. This may also allow for ice to be placed in container body 702, while filter 124 is removed. Once filled, the band 728 and attached filter assembly may be placed into mouth 708, and the user may pour water through the filter 124 and out the combined inlet and outlet 708. In another embodiment, filter assembly 124 may serve as a dual pass filter, so that water is introduced through mouth 708, and passes through filter assembly 124 on entry, and again on exit.

FIG. 8B illustrates a similar carafe container body 702', also including a widened mouth, and adjacent narrowed section 726, but including a flow directing tube 730 or other element that is removably attachable to or fixed relative to the filter assembly 124 and configured to help direct the flow of the water as it is poured from mouth 708.

Figure 8C:
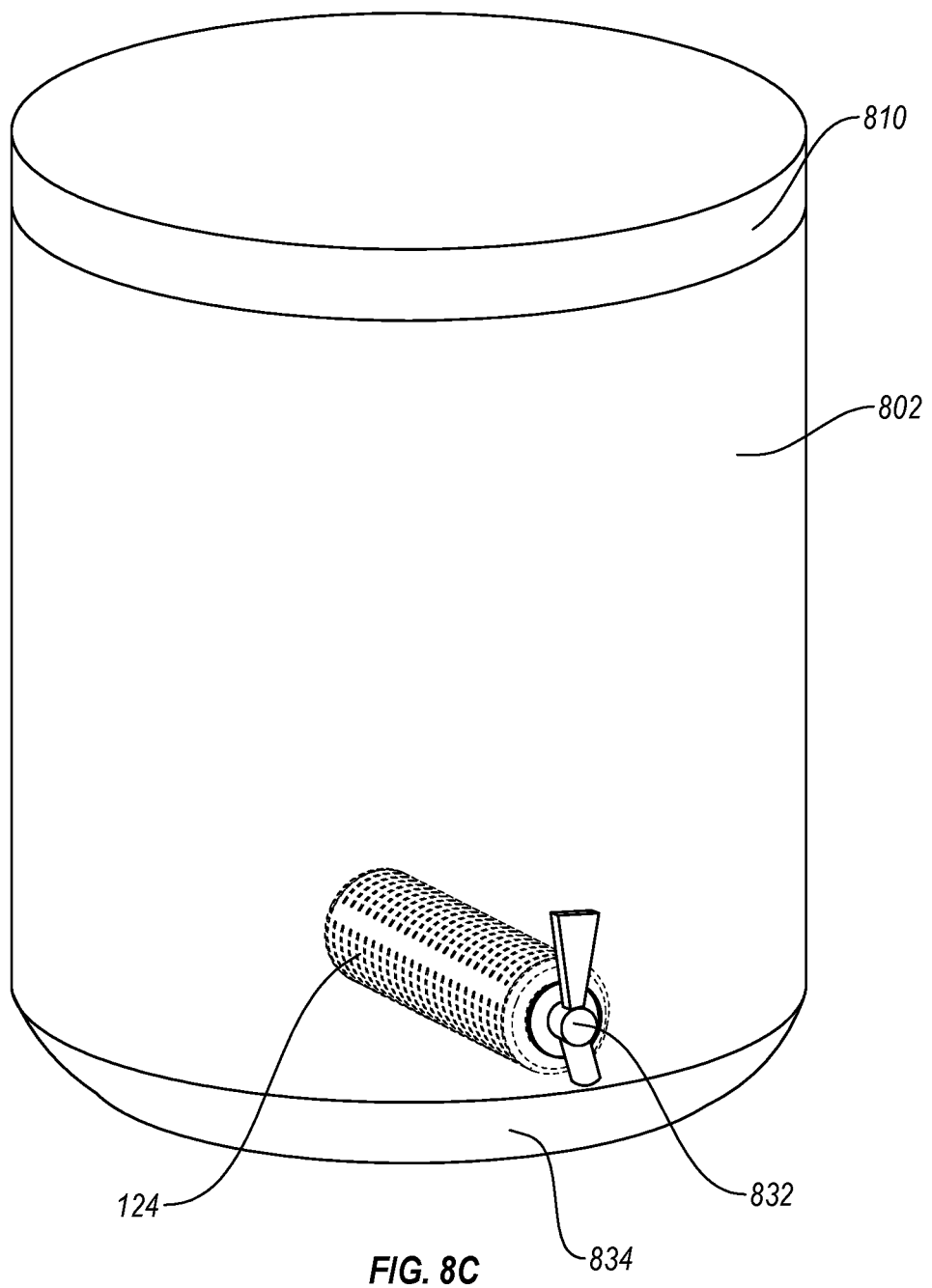
FIG. 8C illustrates another embodiment of a filter-as-you-pour system, where the container body is configured as a water cooler.

As shown in FIG. 8C, the container body 802 may be a water jug with a spigot 832 located near the bottom 834 of container body 802. A filter assembly 124 may be placed next to and inline (in the flow path) of spigot 832 so that any water that pours out of the spigot 324 first passes through the filter assembly 124. Lid 810 may be provided, and may be removed to allow filling of container body 802 with water, and ice, if desired.

Figure 8D:
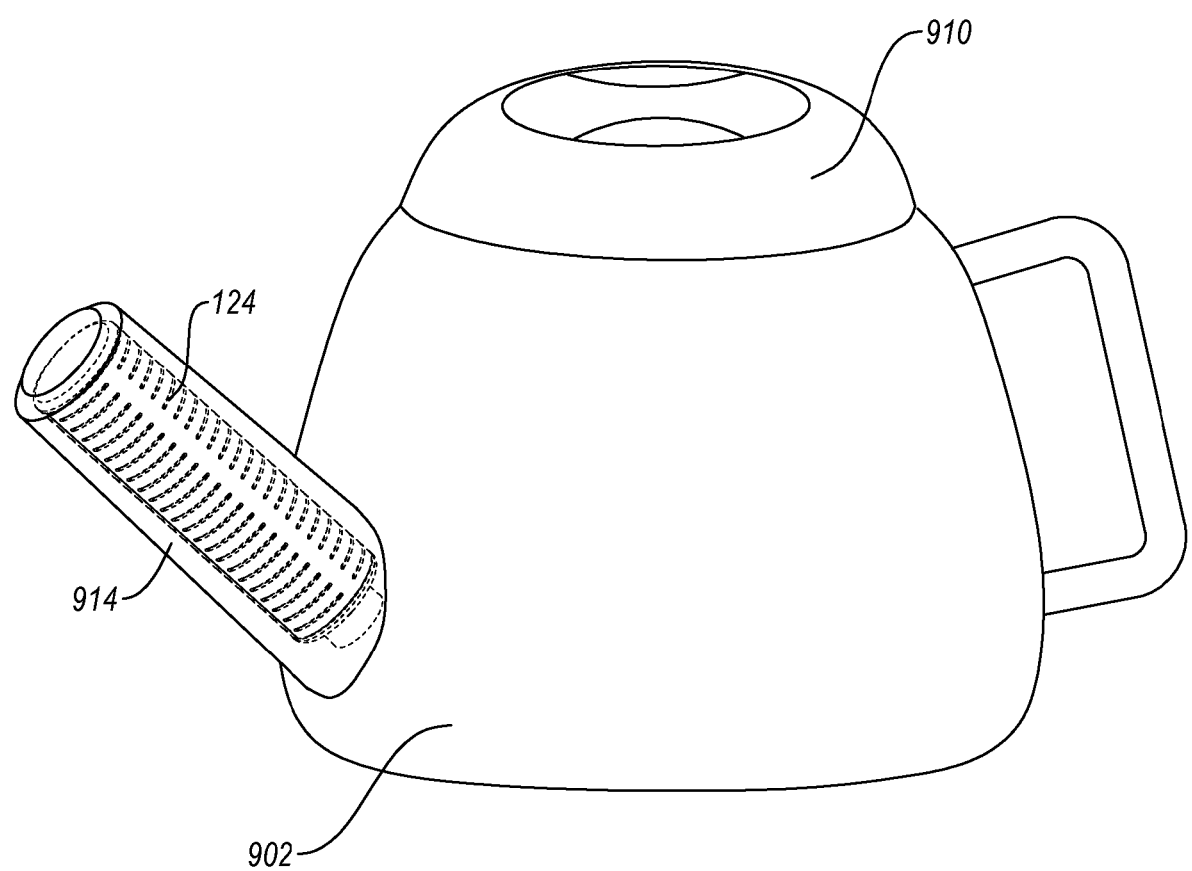
FIG. 8D illustrates another embodiment of a filter-as-you-pour system, where the container body comprises an alternative pitcher configuration, with an elongate spout.

FIG. 8D illustrates another embodiment, where filter assembly 124 may not necessarily be located within container body 902. For example, container body 902 may be configured with a spout 914 of extended length (e.g., at least the length of the filter assembly, such as 3 to 8 inches). A lid 910 may be provided. Such a container may resemble a teapot or watering can. The filter assembly may be disposed within the elongate spout that extends from the container body. By removing the filter assembly 124 from within the container body itself, the internal storage volume provided by the container body may be increased.

Various other features of exemplary systems may be disclosed in one or more of the following patents and/or published patent applications, each herein incorporated by reference: U.S. Pat. Nos. 10,125,027; 10,035,713; U.S. Publication No. 2016-0376161; U.S. Publication No. 2016-0376162; U.S. Pat. No. 10,351,442; and U.S. Publication No. 2016-0376165.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A filter-as-you-pour system configured to filter water as the water is poured from the system, comprising:
   a container body defining an internal storage volume extending from a closed bottom to an open top;

a lid body attachable to the open top of the container body, the lid body defining a fluid outlet;

a filter assembly attachable to the lid body, the filter assembly including a frame member extending between a first closed end to a second open end, the frame member comprising a plurality of circumferential support members and a plurality of axial support members coupled to the circumferential support members to define a plurality of openings that pass to a central hollow section in the filter assembly; and an activated carbon textile filter media wrapped around the frame member and in contact with the frame member from the first closed end to the second open end of the frame member along an entire length of the activated carbon textile filter media to present a curved surface to the water entering and passing through a curved surface of the filter assembly;

wherein as the water is poured from the container body and exits through the fluid outlet of the lid body, all the water exiting through the fluid outlet passes through the filter assembly to filter the water before exiting through the fluid outlet.

2. The filter-as-you-pour system of claim 1, wherein the second open end of the filter assembly includes an open and non-partitioned filter top extending from the central hollow section to freely pass the water through the open and non-partitioned filter top to the fluid outlet in the lid body.

3. The filter-as-you-pour system of claim 2, wherein the filter assembly includes the frame member with the activated carbon textile filter media wrapped there around and a shell sandwiching and contacting the activated carbon textile filter media between the frame member and the shell, wherein the shell includes slots configured to enable the water to flow into the curved surface of the filter assembly from the container body in a radial direction toward a longitudinal axis of the filter assembly, and flow out of the open and non-partitioned filter top of the filter assembly towards the fluid outlet in the lid body in an axial direction.

4. The filter-as-you-pour system of claim 1, wherein the system is configured to provide a minimum flow rate of 0.3 gallons per minute.

5. The filter-as-you-pour system of claim 1, wherein the container body is a water bottle shaped container body.

6. The filter-as-you-pour system of claim 5, wherein the water bottle shaped container body is substantially cylindrical and the lid body is substantially circular.

7. The filter-as-you-pour system of claim 6, wherein a diameter of the container body substantially corresponds to a diameter of the lid body.

8. The filter-as-you-pour system of claim 1, wherein the second open end of the filter assembly is threadably coupled to an annular threaded locking structure extending from the lid body.

9. The filter-as-you-pour system of claim 8, wherein the filter assembly is attached at a center of the lid body.

10. The filter-as-you-pour system of claim 8, wherein the filter assembly is attached off-center from the lid body.

11. The filter-as-you-pour system of claim 1, wherein the lid body further includes a downward facing lip having an outer ridged surface.

12. The filter-as-you-pour system of claim 1, wherein a fluid inlet and the fluid outlet extend through a single opening.

13. The filter-as-you-pour system of claim 1, wherein the filter assembly comprises a gravity flow filter having a flow rate from about 0.3 gallons per minute to about 2 gallons per minute.

14. The filter-as-you-pour system of claim 1, wherein the frame member of the filter assembly includes a threaded cylindrical neck configured to threadably attach to the lid body adjacent the fluid outlet.

15. The filter-as-you-pour system of claim 11, wherein the downward facing lip includes an internal threaded surface configured to threadably engage an outer threaded surface of the container body.

16. The filter-as-you-pour system of claim 1, wherein the activated carbon textile filter media extends from a bottom edge at the first closed end of the frame member to a top edge at the second open end.

17. A filter-as-you-pour system configured to filter water as the water is poured from the system, comprising:

a container body defining an internal storage volume extending from a closed bottom to an open top;

a lid body attachable to the open top of the container body, the lid body defining a fluid outlet;

a filter assembly attachable to the lid body, the filter assembly including an inner hollow core frame member extending between a first closed end to a second open end and a shell positioned over the inner hollow core frame member, the shell includes slots configured to enable the water to flow into the filter assembly from the container body in a radial direction toward a longitudinal axis of the filter assembly; and a filter media comprising an activated carbon textile material, the activated carbon textile material wrapped around and in contact with an entire length of a sidewall of the inner hollow core frame member from the first closed end to the second open end to define a central hollow section and to present an annular curved surface to the water entering and passing through the activated carbon textile material;

wherein the shell sandwiches and contacts the activated carbon textile material between the inner hollow core frame member and the shell.

18. The filter-as-you-pour system of claim 17, wherein the filter assembly includes an open and non-partitioned filter top extending from the central hollow section such that all the water exiting through the fluid outlet passes through the filter assembly and through the open and non-partitioned filter top to the fluid outlet.

19. The filter-as-you-pour system of claim 17, wherein the filter assembly comprises a gravity flow filter having a flow rate from about 0.3 gallons per minute to about 2 gallons per minute.

20. The filter-as-you-pour system of claim 17, wherein the inner hollow core frame member of the filter assembly includes a threaded cylindrical neck configured to threadably attach to an annular threaded locking structure extending from the lid body and about the fluid outlet of the lid body.

21. The filter-as-you-pour system of claim 17, wherein a fluid inlet and the fluid outlet extend through a single opening.

* * * * *